United States Patent
Dodd et al.

(10) Patent No.: US 11,014,416 B2
(45) Date of Patent: May 25, 2021

(54) AUTONOMOUS DOCK

(71) Applicant: EATON INTELLIGENT POWER LIMITED, Dublin (IE)

(72) Inventors: Conor H Dodd, Kalamazoo, MI (US);
Nathan H Cox, Portage, MI (US);
Matthew T Boillat, Scotts, MI (US);
Jon A Steeby, Schoolcraft, MI (US);
Sujay Sirur, Kalamazoo, MI (US);
Rajeev Verma, Troy, MI (US); Vishal V. Mahulkar, Columbus, IN (US);
Vasilios Tsourapas, Northville, MI (US); Kevin Snow, Battle Creek, MI (US)

(73) Assignee: Eaton Intelligent Power Limited, Dublin (IE)

( * ) Notice: Subject to any disclaimer, the term of this patent is extended or adjusted under 35 U.S.C. 154(b) by 250 days.

(21) Appl. No.: 16/061,332

(22) PCT Filed: Dec. 9, 2016

(86) PCT No.: PCT/US2016/066027
§ 371 (c)(1),
(2) Date: Jun. 11, 2018

(87) PCT Pub. No.: WO2017/100716
PCT Pub. Date: Jun. 15, 2017

(65) Prior Publication Data
US 2019/0039425 A1    Feb. 7, 2019

Related U.S. Application Data

(60) Provisional application No. 62/266,220, filed on Dec. 11, 2015.

(51) Int. Cl.
*B60D 1/36*    (2006.01)
*B60W 10/02*   (2006.01)
(Continued)

(52) U.S. Cl.
CPC ............. *B60D 1/36* (2013.01); *B60D 1/015* (2013.01); *B60D 1/62* (2013.01); *B60R 19/48* (2013.01);
(Continued)

(58) Field of Classification Search
CPC ....................................... B60D 1/36
See application file for complete search history.

(56) References Cited

U.S. PATENT DOCUMENTS 5,191,328 A    3/1993  Nelson
5,861,802 A    1/1999  Hungerink et al.
(Continued)

FOREIGN PATENT DOCUMENTS

CA    2168069 C      3/2000
CN    101146707 A    3/2008
(Continued)

OTHER PUBLICATIONS http://www.sae.org/misc/pdfs/J1939.pdf; "The SAE J1939 Communications Network: An overview of the J1939 family of standards and how they are used," Downloaded Dec. 5, 2016, pp. 1-7.
(Continued)

*Primary Examiner* — Michael A Berns
(74) *Attorney, Agent, or Firm* — Mei & Mark LLP

(57) ABSTRACT

An autonomous dock system for a vehicle, comprises a control system with instructions comprising steps for receiving a request to implement an autonomous dock routine. A vehicle speed and clutch position are calculated. A clutch position controller is commanded to maintain the calculated clutch position. An actual torque amount is iteratively detected as transferred across the clutch. A vehicle speed-control mechanism is commanded to maintain the calculated vehicle speed, and the actual vehicle speed is iteratively detected. When comparing the commanded vehicle speed to
(Continued)

the detected actual vehicle speed indicates that the detected actual vehicle speed is below a speed threshold, and when the actual torque amount transferred across the clutch exceeds a torque threshold, the control system commands an increase in vehicle speed.

34 Claims, 20 Drawing Sheets

(51) Int. Cl.
| | |
|---|---|
| *B60W 10/06* | (2006.01) |
| *B60R 19/48* | (2006.01) |
| *B60W 10/20* | (2006.01) |
| *B60D 1/62* | (2006.01) |
| *B60D 1/01* | (2006.01) |
| *B60W 30/18* | (2012.01) |
| *B60W 10/10* | (2012.01) |
| *B60W 40/105* | (2012.01) |
| *G05D 1/00* | (2006.01) |
| *G05D 1/02* | (2020.01) |

(52) U.S. Cl.
CPC ............ *B60W 10/02* (2013.01); *B60W 10/06* (2013.01); *B60W 10/10* (2013.01); *B60W 10/20* (2013.01); *B60W 30/18036* (2013.01); *B60W 40/105* (2013.01); *G05D 1/0088* (2013.01); *G05D 1/0223* (2013.01); *B60W 2300/14* (2013.01); *B60W 2710/0605* (2013.01); *B60W 2710/1005* (2013.01); *B60W 2720/10* (2013.01); *B60Y 2200/147* (2013.01); *G05D 2201/0213* (2013.01)

(56) References Cited

U.S. PATENT DOCUMENTS

| | | | |
|---|---|---|---|
| 5,868,379 A | 2/1999 | Ellis | |
| 6,285,278 B1 | 9/2001 | Schutt et al. | |
| 6,452,485 B1 | 9/2002 | Schutt et al. | |
| 6,592,230 B2 | 7/2003 | Dupay | |
| 7,072,763 B2 | 7/2006 | Saxon et al. | |
| 7,497,457 B2* | 3/2009 | Jamieson | B60D 1/06 280/441.2 |
| 7,548,155 B2 | 6/2009 | Schutt et al. | |
| 7,755,511 B2 | 7/2010 | Satoshi et al. | |
| 7,777,615 B2* | 8/2010 | Okuda | B60D 1/36 280/477 |
| 7,823,902 B2 | 11/2010 | Jameison | |
| 8,042,825 B2* | 10/2011 | Jamieson | B60D 1/06 280/460.1 |
| 8,191,915 B2* | 6/2012 | Freese | B60D 1/36 280/477 |
| 8,528,929 B2 | 9/2013 | Kimener | |
| 8,571,722 B2* | 10/2013 | Samples | G08G 1/168 701/1 |
| 9,327,705 B2 | 5/2016 | Schwitters et al. | |
| 9,403,413 B2 | 8/2016 | Tatty et al. | |
| 9,555,805 B2 | 1/2017 | Mair et al. | |
| 9,599,054 B2* | 3/2017 | Kawamoto | F02D 41/123 |
| 9,665,101 B1* | 5/2017 | Templeton | B60W 40/08 |
| 9,720,411 B2* | 8/2017 | Crombez | B60W 50/08 |
| 10,035,457 B2* | 7/2018 | Singh | B60R 1/00 |
| 10,081,504 B2* | 9/2018 | Walford | G05D 1/0225 |
| 2003/0111902 A1 | 6/2003 | Thiede et al. | |
| 2006/0028065 A1 | 2/2006 | Thiede et al. | |
| 2006/0076754 A1 | 4/2006 | Jamieson | |
| 2007/0200316 A1 | 8/2007 | Jameison | |
| 2007/0208482 A1 | 9/2007 | Thiede et al. | |
| 2008/0174452 A1 | 7/2008 | Satoshi et al. | |
| 2009/0236825 A1 | 9/2009 | Okuda et al. | |
| 2010/0096203 A1 | 4/2010 | Freese V et al. | |
| 2010/0194074 A1 | 8/2010 | Jamieson et al. | |
| 2012/0310459 A1 | 12/2012 | Schwitters et al. | |
| 2013/0226390 A1 | 8/2013 | Luo et al. | |
| 2015/0291168 A1 | 10/2015 | Mair et al. | |
| 2015/0321666 A1 | 11/2015 | Tatty et al. | |
| 2016/0052548 A1 | 3/2016 | Singh et al. | |
| 2016/0075281 A1 | 3/2016 | Singh et al. | |
| 2018/0346029 A1* | 12/2018 | Kabos | B62D 15/027 |
| 2019/0064835 A1* | 2/2019 | Hoofard | B60D 1/245 |

FOREIGN PATENT DOCUMENTS

| | | |
|---|---|---|
| CN | 101722954 A | 6/2010 |
| CN | 102652091 A | 8/2012 |
| CN | 104973061 A | 10/2015 |
| CN | 105082910 A | 11/2015 |
| JP | 2008509869 A | 4/2008 |
| WO | 2014174027 A1 | 10/2014 |

OTHER PUBLICATIONS

Written Opinion and International Search Report for PCT/US2016/066027 dated Apr. 11, 2017, pp. 1-19.

\* cited by examiner

AUTONOMOUS DOCK

This is a § 371 National Stage Entry of PCT/US2016/066027 filed Dec. 9, 2016, and claims the benefit of U.S. provisional application No. 62/266,220, filed Dec. 11, 2015, all of which are incorporated herein by reference.

FIELD

This application relates to systems and methods for automatically controlling truck motion via an electronically controlled transmission.

BACKGROUND

Typical truck & trailer backing scenario includes approaching a loading dock for loading and unloading a trailer. The operator must judge the distance the trailer is to the loading dock and carefully "touch" the trailer to the loading dock to avoid damage to either the dock or the trailer. However, operators are efficiency driven, and approaching the loading dock quickly and then bumping into the dock is a normal practice in the field. Hard bumps eventually fatigue metal and concrete components of the trailer or loading dock, resulting in bending or breaking. This trailer to loading dock impact is controlled by the driver.

Similarly, issues arise when coupling a $5^{th}$ wheel based tractor to a kingpin trailer. It has been practice to back the tractor's $5^{th}$ wheel underneath the trailer and gently push the kingpin into the $5^{th}$ wheel locking mechanism. This task is successful when both tractor and trailer gently "click" together without slamming into the kingpin. Slamming damages the latching mechanism or the kingpin itself. However, gently "clicking" consistently provides high quality tractor—trailer coupling. Conversely, when decoupling a trailer, a smooth and steady procedure is highly desirable, one without torque transients or accelerations.

A part of vehicle operation involves positioning a vehicle at least close to a target, or better yet, "firming touching" the target, such as a docking dock. The problem has at least two parts:
  a) In order to avoid contacting the object too harshly, the vehicle would have to move very slowly until initial contact was made. However, the positioning maneuver may be starting from 5 or more meters away, which means that the operation will take an unacceptable amount of time.
  b) To resolve the time issue, it is possible to move quickly. A new problem emerges, where vehicle to loading dock contact is abrupt, causing at least driver dissatisfaction, possibly up to vehicle or loading dock damage.

The issue to solve is getting the vehicle to the target position without taking "too much time" or contacting it "harshly enough" to cause operator dissatisfaction or loss of quality of the function.

SUMMARY

The methods disclosed herein overcome the above disadvantages and improves the art by way of An autonomous dock system, comprises a vehicle comprising a computer-controlled transmission system. At least one sensing mechanism is on the vehicle. At least one transponder is on a dock target. A control system comprises a processor, tangible memory device, and processor executable instructions stored in the tangible memory device. The instructions comprise steps for calculating a connection distance between the at least one sensing mechanism and the at least one transponder. And the instructions comprise steps for controlling the transmission system to autonomously ramp vehicle speed to connect the vehicle with the dock target.

In additional aspects, an autonomous dock routine comprises controlling the transmission system to autonomously ramping vehicle speed upwards and downwards to connect the vehicle with the dock target. The vehicle can be a tractor trailer or truck comprising a rear bumper. The dock target can be a loading zone or unloading zone, and the control system aligns the rear bumper adjacent the dock target.

The connection distance can comprise a closing distance and the control system can autonomously ramp vehicle speed upwards along the connection distance, and, when the closing distance is encountered, the control system can autonomously ramp vehicle speed downwards.

The control system can autonomously sense a stopped vehicle condition and ramp a vehicle throttle to overcome the stopped vehicle condition. A timing factor can be applied to the throttle ramping. When the stopped condition is not overcome within a limit of the timing factor, the control system can autonomously implements a parked condition or a neutral condition.

The autonomous dock system can comprises at least two sensing mechanisms and at least two axles on the vehicle. Each axle comprises a respective first end and a respective second end. A first of the at least two sensing mechanisms is located on a first end of a first axle. A second of the at least two sensing mechanisms is located on a second end of the first axle. The dock target can comprise at least two transponders spaced by a transponder distance. The control system can apply a triangulation technique to determine a trajectory for the vehicle to align with the dock target. The triangulation technique can be used to determine the connection distance. The trajectory and connection distance calculations can be iteratively updated. Transmission settings can be updated based on the updates to the connection distance.

In an alternative aspect, an autonomous dock system can comprise a control system integrated into a movable vehicle. The control system can comprise a controller area network, a location sensing mechanism, a steering mechanism, a speed-control mechanism, a processor, a tangible memory device, and processor executable instructions stored in the tangible memory device. The instructions can comprise steps for calculating a connection distance between the location sensing mechanism on the movable vehicle and at least one transponder on a target, selecting connection speed settings for the speed-control mechanism based upon an impact limit of the target, calculating a trajectory between the movable vehicle and the target, formulating a control scheme for the steering mechanism, and commanding the steering mechanism and the speed-control mechanism of the movable vehicle to contact the movable vehicle with the target. The vehicle speed can be ramped from a parked condition, through the connection speed settings, and back to the parked condition.

The instructions can further comprise aspects for calculating a closing distance as a subset of the connection distance. A closing speed setting can be selected as a lower-speed subset of the connection speed settings, and the instructions can comprise autonomously ramping the vehicle speed to the lower-speed subset over the closing distance.

The instructions can comprise autonomously sensing a stopped vehicle condition and implementing a ramping sequence to overcome the stopped vehicle condition. The ramping sequence can comprise determining an upper ramping speed limit, instructing the speed-control mechanism to increase vehicle speed up to the determined upper ramping speed limit, and applying a timing factor to limit the time the vehicle speed is maintained at the upper ramping speed limit. The instructions can comprise iteratively determining whether the stopped vehicle condition is sensed or whether a moving condition is sensed, and, when the stopped vehicle condition is sensed in excess of the timing factor, the routine can autonomously implement one of a parked condition or a neutral condition.

It is possible to select connection speed settings based upon one or more of vehicle load, stall-out characteristics of the vehicle, amount of connection distance, sensed vehicle grade, and calculated trajectory. The upper ramping speed limit can be determined based upon one or more of vehicle load, stall-out characteristics of the vehicle, sensed vehicle grade, and calculated trajectory, and further determined based upon the impact limit of the target.

The speed control mechanism can comprise a computer-controlled transmission comprising a rotatable input shaft connection, and wherein the instructions further comprise restricting the rotatable input shaft connection based on the impact limit of the target.

The speed control mechanism can comprise a computer-controlled throttle mechanism comprising a range of open and closed positions between fully open and fully closed. The instructions can further comprise mapping the range of open and closed positions based on the impact limit of the target.

The speed control mechanism can comprise a computer-controlled clutch mechanism. The instructions can further comprise commanding that the clutch mechanism remain unlocked.

The speed control mechanism can comprise a computer-controlled clutch mechanism affiliated with an engine. The instructions can further comprise determining whether the engine is in a high idle condition or a low idle condition. When the engine is in a high idle condition, the instructions can comprise selecting connection speed settings that permit the clutch to lock with respect to the engine. When the engine is in a low idle condition, the instructions can comprise selecting connection speed settings that prevent the clutch from locking with respect to the engine.

Calculating a trajectory can comprise identifying an initial vehicle position and an initial vehicle orientation. A straight-line path centered on the initial vehicle position in the direction of the initial vehicle orientation can be determined. A target position can be identified. Intersecting lines from the target position to the straight-line path can be calculated. A pair of intersecting lines based upon a circle of the smallest vehicle turning radius that can be achieved tangent to the straight-line path and tangent to the intersecting lines is identified. A shortest path to the target position is selected based upon the identified pair of intersecting lines.

A controller area network communicates with a transponder on the target, wherein the transponder comprises one of a global positioning system (GPS), real-time kinematics system (RTK), radio-frequency system (RF device), or vehicle on-board RADAR (VORAD). The target can comprise one of a trailer, a loading zone, or an unloading zone.

The location sensing mechanism comprises one of a global positioning system (GPS), real-time kinematics system (RTK), radio-frequency system (RF device), or vehicle on-board RADAR (VORAD). The vehicle can further comprise a $5^{th}$ wheel coupled to a kingpin. The location sensing mechanism can further comprise an angle sensor coupled between the $5^{th}$ wheel and the kingpin. Commanding the steering mechanism can comprise iteratively determining a sensed angle between the $5^{th}$ wheel and the kingpin, determining if the sensed angle corresponds to the commanded vehicle trajectory, and adjusting the steering mechanism to correspond the vehicle movement to align with the selected shortest path.

An autonomous dock system for a vehicle can alternatively comprise a control system integrated into the vehicle. The control system can comprise a controller area network, a vehicle speed-control mechanism, a vehicle speed detection system, a clutch for transferring torque for the vehicle speed-control mechanism, the clutch comprising a clutch position controller, a clutch torque detection system, and a master controller comprising a processor, a tangible memory device, and processor executable instructions stored in the tangible memory device. The instructions can comprise steps for receiving a request to implement an autonomous dock routine. A vehicle speed and clutch position can be calculated based on the received request. The clutch position controller can be commanded to maintain the calculated clutch position. An actual torque amount transferred across the clutch can be iteratively detected. The vehicle speed-control mechanism can be commanded to maintain the calculated vehicle speed. The actual vehicle speed can be iteratively detected. The commanded vehicle speed can be iteratively compared to the detected actual vehicle speed. When comparing the commanded vehicle speed to the detected actual vehicle speed indicates that the detected actual vehicle speed is below a speed threshold, and when the actual torque amount transferred across the clutch exceeds a torque threshold, the instructions comprise commanding an increase in vehicle speed.

A timer can be applied to limit the amount of time for commanding the increase in vehicle speed. When the timer is exceeded, and when comparing the commanded vehicle speed to the detected actual vehicle speed indicates that the detected actual vehicle speed is below a speed threshold, and when the actual torque amount transferred across the clutch exceeds a torque threshold, the instructions comprise commanding an exit from the autonomous docking routine. Alternatively, applying a timer to limit the amount of time for commanding the increase in vehicle speed can comprise, when the timer is exceeded, and when comparing the commanded vehicle speed to the detected actual vehicle speed. When the comparison indicates that the detected actual vehicle speed is at or substantially at zero, the instructions comprise commanding an exit from the autonomous docking routine The vehicle speed-control mechanism commands can comprise implementing one of a feed-forward subroutine or a feedback subroutine to adjust the vehicle speed-control mechanism to maintain the calculated vehicle speed.

The instructions for commanding an exit from the autonomous docking routine can comprise, when the actual torque amount transferred across the clutch exceeds a torque threshold, comparing the commanded vehicle speed to the detected actual vehicle speed to indicate that the vehicle has stopped moving. The exit from the autonomous dock routing can be commanded after experiencing a wheel slip, and when the actual torque amount transferred across the clutch exceeds a torque threshold.

The instructions for commanding an exit from the autonomous docking routine can be implemented when comparing the commanded vehicle speed to the detected actual vehicle speed indicates that the vehicle speed has decreased, and the actual torque amount transferred across the clutch increases at or above a torque threshold rate of change.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
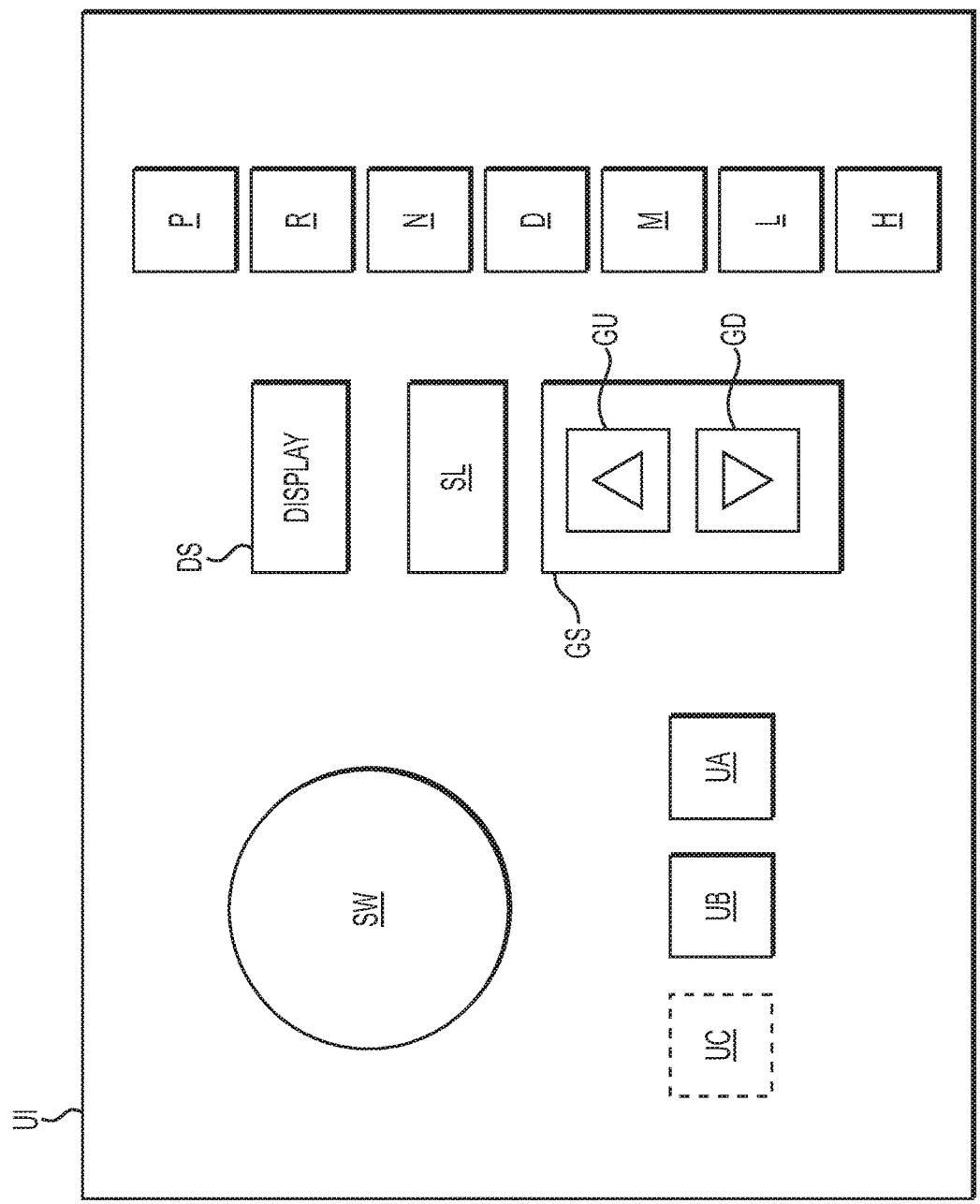
FIG. 1 is a schematic view of a user interface.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. However, "up" and "down" are used to indicate a gear-shifting direction wherein the transmission changes a gear ratio.

Vehicles have a variety of complexities for operation. In the heavy duty and medium duty trucking industry, additional complexities arise with the use of automated transmissions. Human-in-the-loop systems permit drivers to select automatic gear-shifting modes or manual modes. At times, these systems over-ride user selections to avoid clutch abuse or transmission abuse. Some systems comprise, for example 8, 10, 13, or 18, different gear selections for operation. And, systems can comprise a combination of buttons and switches to use in combination with a gear-selection mechanism. For example, one existing system comprises a Hi-Lo splitter and a range switch to be used with a gear-shift knob, clutch pedal, brake pedal, and accelerator pedal. In this system, a driver can go through neutral, $1^{st}$ gear low, $1^{st}$ gear high, $2^{nd}$ gear low, $2^{nd}$ gear high, $3^{rd}$ gear low, $3^{rd}$ gear high, $4^{th}$ gear low, $4^{th}$ gear high, $5^{th}$ gear low, and $5^{th}$ gear high, yet still be below 15 miles per hour in operation speed. This level of selection is excellent when the driver must navigate cities, crowded rest-stops, different vehicle grades, different slip conditions, etc. The driver can select gears based on environmental driving conditions and vehicle conditions, such as affiliated load (type of trailer, weight of load, load imbalance, etc.), vehicle upgrades, engine torque output characteristics, clutch pedal "hardness," transmission shift characteristics, etc. Some of the available systems actively limit the top gear available to the driver in reverse Exemplary systems can comprise Eaton-Fuller transmissions, ULTRASHIFT or ULTRASHIFT Plus land vehicle transmission and parts thereof manufactured by Eaton Corporation of Cleveland, Ohio, or PROCISION land vehicle transmissions and parts therefor manufactured by Eaton Corporation of Cleveland, Ohio. In addition to these examples, other computer-controlled vehicle architectures are compatible with the auto-dock features described herein. The principles can apply to heavy duty, medium duty, and light duty vehicles, such as line haul, performance, vocational, truck, bus and other vehicles.

In light of the complexities of maintaining low-speed vehicle operations, it is desirable to extend autonomous control to certain parking or hitching scenarios. Autonomous control of the vehicle at low speeds prevents stalling, clutch abuse, and transmission abuse while permitting a greater range of gear selections. Using the disclosed methods also prevents damage to targets such as trailers, kingpins, loading and unloading docks, terminal parking areas, among others.

A vehicle can comprise numerous inputs based on application, such as hydraulics, cruise control, pneumatics, emergency brake mechanisms, lifts, locking mechanisms, overspeed protection options, grade sensors, etc. Numerous alternatives are available, but FIG. 1 shows a simplified user interface UI. A steering wheel SW can select vehicle direction in manual operation and can interface with a steering control mechanism SM and corresponding steering transceiver and sensor SS.

Some computer-controlled or "automatic" vehicles do not comprise a clutch pedal. Some "automatic" vehicles comprise a clutch pedal for use in a subset of "manual" operating conditions, and so an optional user clutch pedal UC is shown. The clutch pedal UC can comprise a mechanical linkage to a clutch C. A computer-control linkage can also couple to clutch C. Clutch C can comprise a clutch transceiver and sensor CS. The clutch C connects torque output from the engine E to the transmission T. The transmission T directs torque to the drive shaft 20 for distribution to the vehicle wheels, in this example, rear wheels W3, W4. Optional auxiliary devices A1 can be included along the drive shaft 20, between drive axles 12, 14, among other places. The auxiliary devices can comprise one or more of an auxiliary coupler (AUX), transfer case, rear drive unit (RDU), and differential, among others. At least one transceiver and sensor A1S can be included on the auxiliary devices A1.

The user interface UI can comprise inputs for user brakes UB, which can comprise a braking pedal for manual brake activation, an activator for parking brakes, a hydraulic or pneumatic brake activator, emergency braking activators, among other inputs. The user brakes UB on the user interface UI can connect to wheel brakes B1, B2, B3, B4. The wheel brakes can also be computer controlled via ECU. A transceiver and brake sensor BS1, BS2, BS3, BS4 is included at two or more wheels, on each axle, or as needed based on the number of axles and wheels on the vehicle. In addition to sensing brake conditions, brake sensors can be used, or supplemented with additional sensors, to sense wheel slip, mu-slip, grade, ground-clearance, or other conditions. A two axle, four wheel W1, W2, W3, W4 vehicle is shown in FIG. 2. A rear-wheel drive (RWD) vehicle is shown, where torque from the engine E is coupled to rear wheels W3, W4 on rear axle shafts 12, 14. The rear wheels W3, W4 grip an underlying surface and "push" the front wheels W1, W2 in to motion on front axle 10. The principles disclosed herein apply equally to front-wheel drive (FWD) and all-wheel drive (AWD) vehicles, where torque is coupled alternatively or additionally to the front wheels W1, W2.

One or more sensor packs SP can augment the functionality of the steering transceiver and sensor SS, brake transceiver and sensors BS1, BS2, BS3, BS4, throttle transceiver and sensor. For example a grade sensor or slip sensor can be de-coupled from the braking system and can be part of a separate sensor pack SP. Combined functionalities are still possible. For example, one or more transceivers TX1, TX2, . . . such as a global-positioning device (GPS), radio device, camera system, VORAD, LIDAR, or RADAR can sense vehicle grade and location. Sensor packs SP can sense roll-over conditions, load balance, load weight, vehicle speed, vehicle direction, and mu-slip, among others. A trajectory sensor, such as angle sensor AS, can be included on the vehicle.

An input for user-selected acceleration UA can comprise an accelerator pedal. Corollary components such as cruise control can be linked to user-selected acceleration UA. Engine E speed, throttle TS position, among others, can be controlled based on user inputs to the user-selected acceleration UA. An engine transceiver and sensor ES can be included for monitoring and controlling the engine speed. A throttle transceiver and sensor TS2 can be included on the throttle T to monitor and control the throttle position. Throttle T can be used to control the air supply to the engine for the combustion process. Details for exhaust gas recirculation (EGR), supercharging or turbocharging are not shown, but can be applied to the principles of the disclosure.

Engine E can be diesel or gas and can utilize any one of a number of combustion methods, such as Otto cycle, Miller cycle, Atkinson cycle, among others. The engine E can be outfitted for any one or more of a variety of variable valve lift techniques, such a late intake valve closing (LIVC), late intake valve opening (LIVO), early intake valve closing (EIVC), early intake valve opening (EIVO), corresponding exhaust valve techniques, combinations of exhaust valve and intake valve techniques, engine braking, cylinder deactivation, etc. Engine E can be cam-style or cam less style, type I, type II, type III, type IV or type V in rocker arm layout. Wankel, in-line, boxer, and V, among other layouts, can also be used. Hybrid vehicle technology can also be paired with the engine system.

Engine E creates torque based on user inputs or autonomous driving control from ECU. Clutch C selectively couples to an engine output interface, such as flywheel F. Clutch C is controlled by the user or by autonomous driving control to close, slip, or open with respect to the engine E. For example, a friction surface is moved towards the flywheel to grip it during closed mode operation. But, during open mode, the friction surface has a gap to prevent torque from transferring from the flywheel F. The clutch can slip when the clutch C is not fully closed or fully opened. The friction surface is coupled to the transmission T. Typically, an input shaft is coupled between the transmission and the clutch. The friction surface is coupled to transfer torque to the input shaft. Many variants are compatible with the concepts disclosed herein, such as dry clutches, wet clutches, damper and predamper assemblies, single-disc, dual disc, "puck" styles and numbers, cushioned clutches, organic or ceramic materials, push-style or pull-style clutches among other variants.

When the clutch C is closed, torque from engine E couples to the transmission T. A transmission transceiver and sensor TS can be included on the transmission. The transmission comprises mechanisms to regulate the torque from the engine. Gear sets are typically used for this function, and can comprise epicyclical (planetary) gear sets or continuously variable (CVT) transmissions, among others.

Selecting gears tailors the torque sent to the drive shaft 20 and tailors aspects such as vehicle drivability, vehicle speed, and vehicle efficiency, among others. Gear selection can be done by user selections on user interface UI. A display DS can indicate what gear the driver is in. Display DS can be analog or digital. For example, a liquid crystal display (LCD) or other lighted or electronic display can generate a visible indication of the current gear selection. Or, a shifter knob position, or a switch, toggle, button, or other selection mechanism provides a visual or synaptic indication of current gear selection. A service indicator SL, such as a service light, audible device, or synaptic device, can indicate improper gear selection, autonomous driving control override, clutch abuse, engine malfunction, and lubricant condition, among many other conditions. Service indicator SL can be integrated in to or with the display DS depending upon the type and resolution of the display DS.

One default condition for a transmission gear set is neutral N. Idle, start, stop, and coast are exemplary times to use neutral gear. For convenience of explanation, the discussion below will discuss gear selection beginning at neutral N, but the conditions leading up to neutral can vary and can comprise moving up and down the gear selection options. A user or subset of an autonomous driving control selects vehicle direction, as by selecting a gear in a default forward direction, or as by selecting a reverse R gear. The user interface UI comprises a drive input D to trigger the transmission to shift from neutral to forward drive gears. A manual input M indicates that the driver would like to override autonomous driving control and manually select gears. Pressing manual input M can also enable user clutch control via clutch pedal UC. User abuse of the system can cause over-ride of manual mode. For example, if the user selects the wrong gear for the engine torque output, an audible tone from service indicator SL can signal to the driver that the computer control has implemented a gear other than the driver selection.

A multitude of user selections can be included on the user interface UI for further gear selection. For example, a shifter knob can comprise a way to toggle between a high gear selector H and a low gear selector L, or buttons or other inputs can be used. The user can "button up" or "button down," of the user can move through shift stick positions, to move through the gears by using a gear selector GS comprising gear up GU and gear down GD inputs. ULTRA-SHIFT and ULSTRASHIFT Plus consoles are examples of compatible user interface UI components.

Figure 2A:
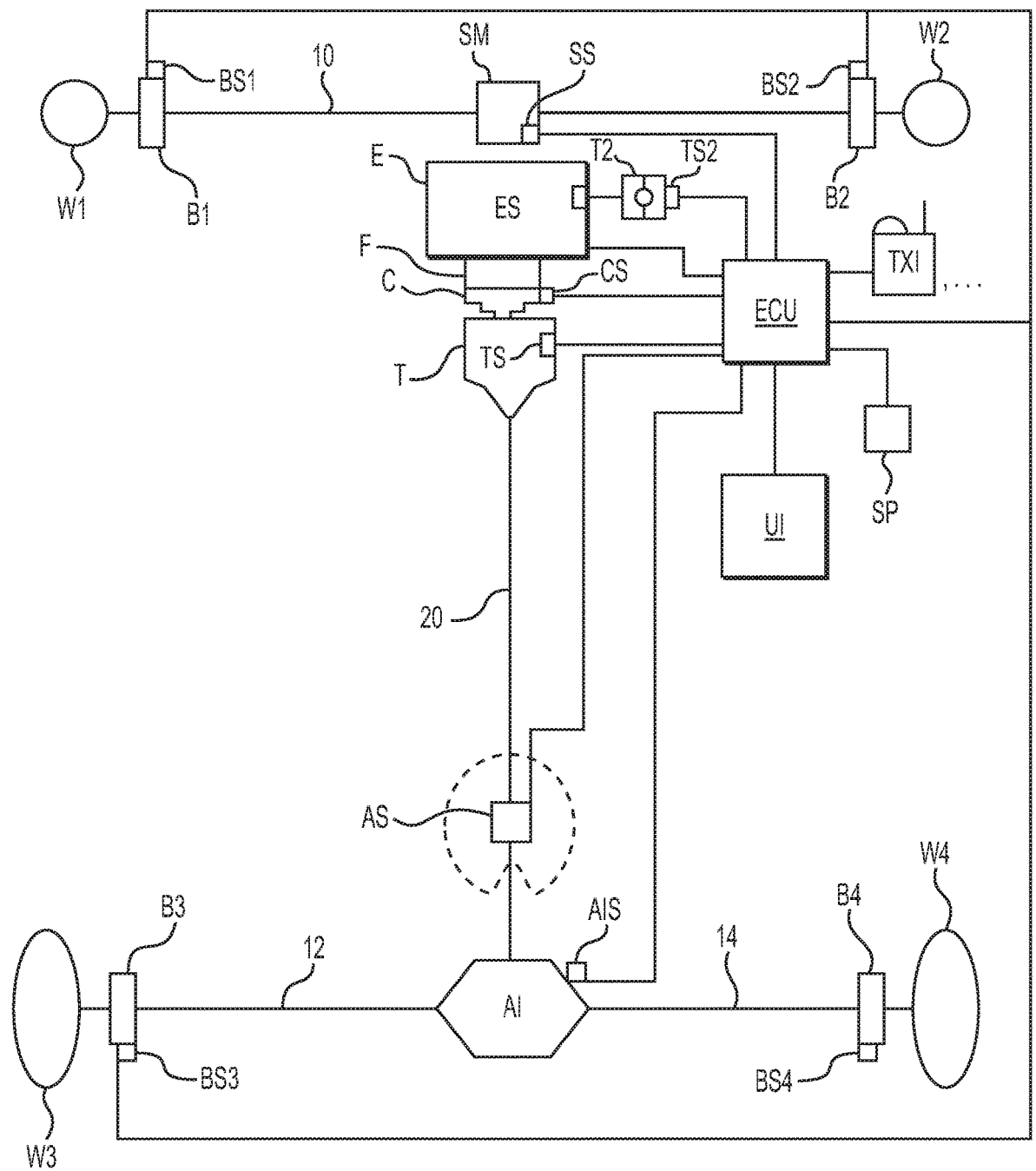
FIGS. 2A and 2B are schematic views of exemplary vehicle layouts.
Figure 2B:
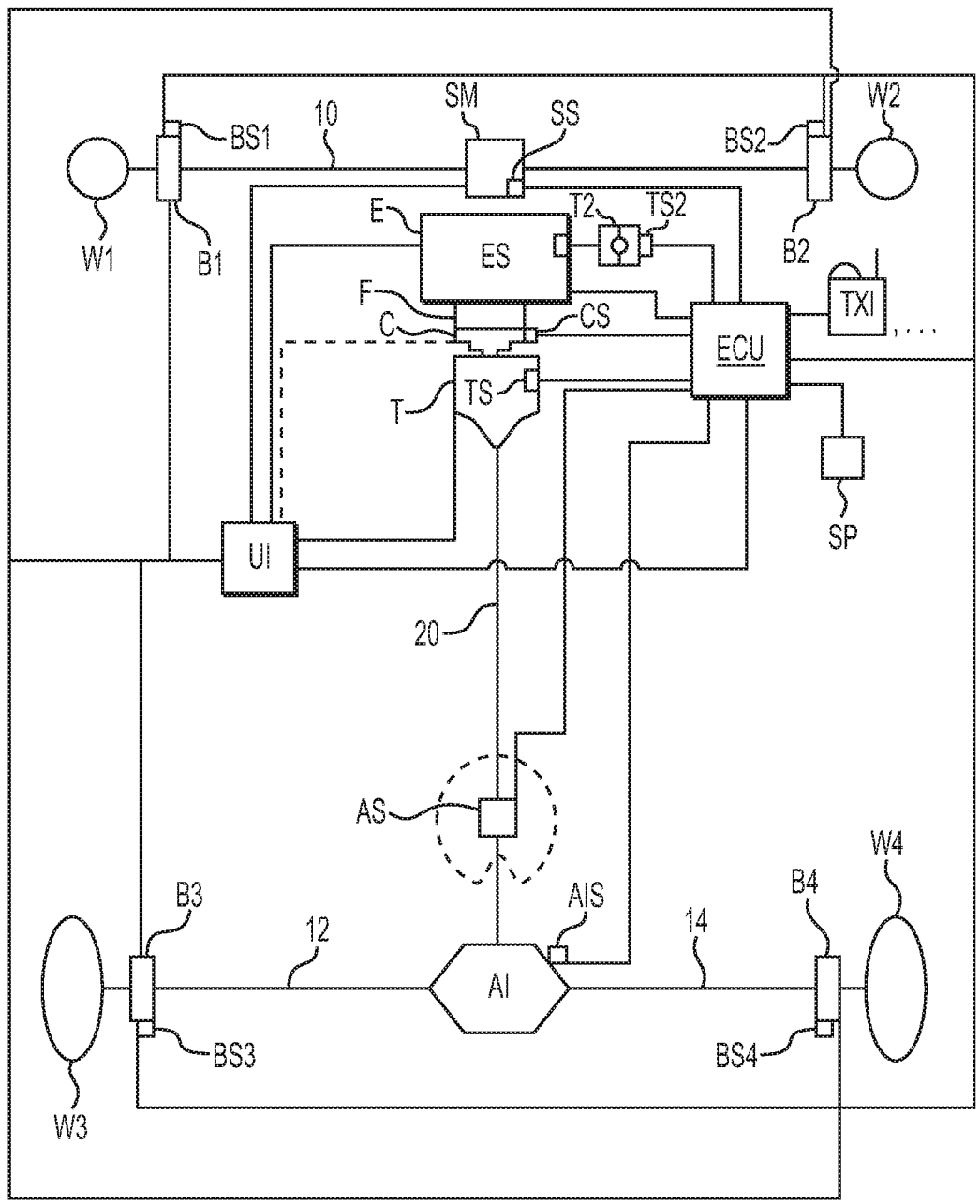

User inputs can be routed from the user interface UI directly to the corresponding vehicle components, as drawn in FIG. 2B. A feedback loop through various sensor packs SP and the various transceivers and sensors SS, BS1-BS4, TS2, TS, ES, A1S, AS, TX1, & CS inform the ECU of the user selections. Redundancy can be achieved by routing all user selections to the ECU and to the corresponding vehicle components. ECU can compare actual (sensed) and user-selected operating parameters to determine a variety of vehicle conditions. Or, as drawn in FIG. 2A, the user inputs pass through the ECU first, as by coupling the user interface UI to the ECU. ECU commands all corresponding vehicle components and receives feedback for adaptive control. ECU comprises a bi-directional control area network CAN to send commands and to receive data.

Some user inputs are routed to ECU in both FIG. 2A and FIG. 2B. For example, as drawn, it is possible to computer-control the throttle T2, while the user-selected acceleration UA is routed to engine E. Or, ECU can control a subset of engine operations, such as variable valve lift techniques and fuel injection, while the user-selected acceleration UA controls the throttle T2.

As above, there are vehicle transmissions comprising up to 18 distinct gear selection options. There are benefits to such complicated systems, but users have difficulty, at times, maneuvering a vehicle comprising 5 gear selections without stalling or damaging the vehicle. So, increasing numbers of gear selections increases the difficulty of operating the vehicle without stalling or damaging it. Add to it the vehicle-to-vehicle, and load-to-load differences, and a feed-forward or adaptive learning autonomous computer control routine is helpful for certain vehicle operating conditions. Maintaining human-in-the-loop functionality assists with entering and exiting the autonomous computer control routine at appropriate times. To this end, an auto-dock input P, such as a docking button on a dashboard, is included on the user interface UI. The auto-dock input P can be used to initiate docking a truck with a trailer, as by coupling a $5^{th}$ wheel to a kingpin. Or, auto-dock input P can initiate moving a truck-bed, trailer, dumper, etc. to align with a loading or unloading zone. Pressing the auto-dock input P initiates ECU-controlled subroutines so that autonomous driving control commands the operation of steering mechanism SM, braking mechanisms B1-B4, auxiliary devices A1, engine E, throttle T2, clutch C, and transmission TS.

Auto-dock functionality can be enabled according to one or more subroutines and safety-checks. In one aspect, auto-dock is initiated in a stopped or parked vehicle mode. User or autonomous driving control has applied one or more brake mechanisms B1-B4 and has shifted the transmission in to neutral gear N. Brake transceivers and sensors BS1-BS4 confirm brake activity to one or more wheels W1-W4. Transmission transceiver and sensor TS confirms transmission gear selection. Additional sensor data can be collected at initialization, including engine speed, clutch position, throttle position, grade, mu-slip, wheel speed, location, trajectory, etc. Sensor packs SP on the target can indicate readiness for docking, target location, dimension, weight, height, category, type, etc, or terrain grade, chuckhole, obstacle or other information. Absent adequate sensing technology to confirm safety of others, vehicle clearance, target readiness or other surrounding conditions, auto-dock functionality is affirmatively selected by user actuation of the auto-dock input P.

A master controller for the vehicle, such as a master electronic control unit ECU 100 can interrelate the various user inputs and autonomous driving controls via a controller area network (CAN). Hard-wiring and wireless connections can be made as necessary in the network. The master 100 controller can comprise at least one processor 120, at least one memory device 110, and algorithms stored in the memory 110 and accessible by the at least one processor 120. The memory device 110 is a tangible storage device, comprising one or more of RAM, ROM, ePROM, USB, or other suitable physical media. In a test environment, the master controller 100 can be, for example DSPACE data processing computer programs, computer software development tools for facilitating the production and development of hardware and software, computer software tools for the configuration of hardware, computer software tools for implementing software on hardware, computer software tools for measuring and generating signals associated with electronic control unit inputs and outputs and software development test and evaluation data of Rathenaustr, Germany auto-box SA 91. In operation, the master controller 100 can be an onboard SAE J1939 compatible device suitable for mass-market implementation. As described by SAE International, "[t]he SAE J1939 communications network is a high speed ISO 11898-1 CAN-based communications network that supports real-time closed loop control functions, simple information exchanges, and diagnostic data exchanges between Electronic Control Units (ECUs), physically distributed throughout the vehicle . . . . The SAE J1939 common communication architecture strives to offer an open interconnect system that allows ECUs associated with different component manufacturers to communicate with each other."

Figure 3:
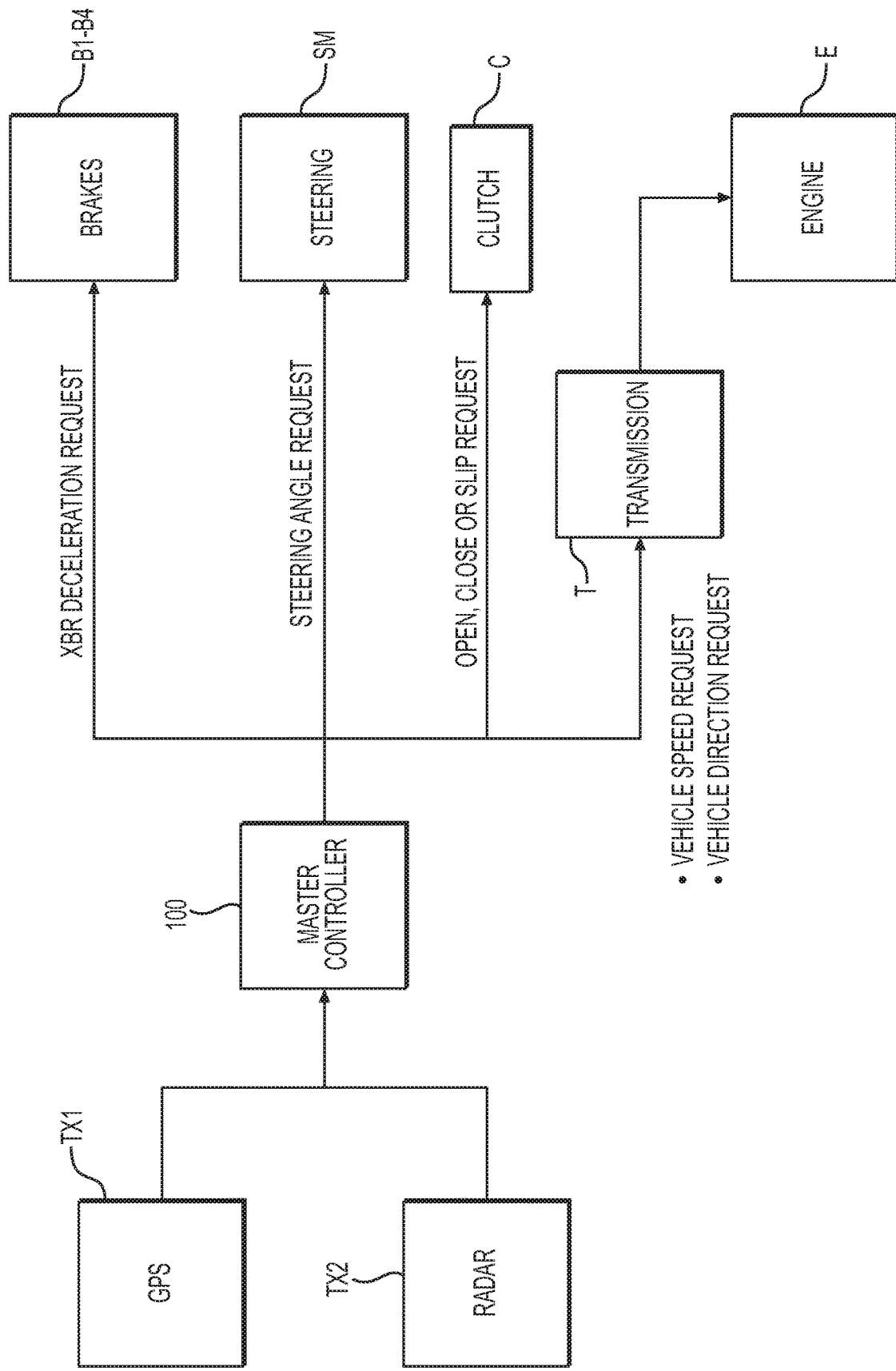
FIG. 3 is an example of a system control architecture.

In one aspect, master controller 100 can directly control brakes B1-B4, steering mechanism SM, clutch C, transmission T, and ultimately, engine E, as drawn in FIG. 3. Master controller 100 can receive inputs from transceivers TX1, TX2, . . . such as a global-positioning device (GPS), a light detection and ranging device (LIDAR), or radio detection and ranging device (RADAR), with GPS and RADAR being the examples used in FIG. 3. As set forth in more detail below, the master controller 100 can then issue a cross-vehicle brake (XBR) deceleration request, a steering angle request, a clutch open, close, or slip request, a transmission direction (forward or reverse) request, and a transmission and engine speed request. The speed request can comprise gear selection, variable valve lift, torque output and other commands. The transmission and engine can be linked for harmonious implementation of gear change and engine speed change requests.

Or, master controller 100 can comprise algorithms that direct the use of other ECUs in the system, such as transmission ECU 200, clutch ECU 300, steering mechanism ECU 400, engine ECU 500, and brakes ECU 600. Additional ECUs can be included based on the sophistication of the vehicle. The other ECUs comprise their own processors 220, 320, 420, 520 & 620, memory devices 210, 310, 410, 510 & 610, and stored processor-executable algorithms. The other ECUs in the system receive commands from master controller 100 and return sensed information back to master controller 100. The other ECUs interface with or comprise the transceivers and sensors SS, BS1-BS4, ES, TS2, CS, TS, AS & A1S described for FIGS. 2A & 2B. The other ECUs can direct the actuation of their associated components via electronically-controlled actuators. The electronically-controlled actuators can comprise a variety of devices, such as motors, pumps, solenoids, pneumatics, etc. Additional options comprise integrating the various ECUs in to an on-board chip, or utilizing allocation programming to separate a single processor in to a multitude of sub-processors comprising the individual ECUs. Other options for integrated or distributed networking can be utilized with the aspects of the disclosure.

Example: Parking or Kingpin Coupling

Using a $5^{th}$ wheel and kingpin coupling as an example of the augmented transmission application, computer control can detect the driver's desire to either allow autonomous couple or decouple to occur, and then commences the procedure. Timing the reaction of the vehicle to gently "click" the kingpin and $5^{th}$ wheel for lock-up becomes part of the master controller 100 control algorithm. The timing must stop the vehicle motion once lock-up occurs, yet provide sufficient coupling action, yet prevent a harsh lockup event. An acceleration sensor can be used on one or both of the truck and the trailer to detect trailer contact and kingpin engagement as they occur, or to detect vehicle parking motions. The computer control can receive the sensor data and quickly control clutch engagement to prevent "kingpin slam" or torque oscillations from the rapid torque ramp-off that can occur when a vehicle contacts its intended target.

To dock a vehicle, such as a truck with a trailer, or to park a vehicle at a location target, the vehicle is set up in proximity to the trailer or location target. An autonomous dock system for a vehicle can comprise a control system integrated into the vehicle. The control system can comprise a controller area network CAN, a vehicle speed-control mechanism comprising at least an engine E and a transmission T or at least a motor, a vehicle speed detection system SS, a clutch C for transferring torque for the vehicle speed-control mechanism, the clutch comprising a clutch position controller in the form of a clutch transceiver and sensor CS, a clutch torque detection system, which can be a subcomponent of the clutch transceiver and sensor CS, and a master controller 100. Master controller 100 can comprise a processor 120, a tangible memory device 110, and processor executable instructions stored in the tangible memory device 110. The instructions can comprising steps for receiving a request to implement an autonomous dock routine, such as the initiate auto-dock step S500 of FIG. 5A.

Master controller 100 can coordinate vehicle commands using an integrated or separate transmission ECU 200. The transmission T can be controlled to limit the vehicle speed and learning subroutines in the transmission ECU 200 can maintain vehicle speed nearly constant, even while performing a lifting function with the trailer. So, master controller can calculate a vehicle speed and clutch position based on the received request to initiate auto-dock, as in step S510. The master controller 100 can command the clutch position controller, such as clutch transceiver and sensor CS, to maintain the calculated clutch position. Open, closed, or slipping positions can be selected, as described more below. The clutch transceiver and sensor CS can iteratively detect an actual torque amount transferred across the clutch and feed torque amount data back to the master controller 100, as in step S530.

The master controller 100 can command the vehicle speed-control mechanism, in this case the transmission transceiver and sensor TS, to maintain the calculated vehicle speed. The can be accomplished by selecting a particular gear based on such things as vehicle load, vehicle grade, target tolerance for being pushed upon, brake type, wheel slip characteristics, etc. Additional control can be had by commanding the engine transceiver and sensor ES to maintain a specific speed, and also by commanding an open or closed position of the throttle T2 via throttle transceiver and sensor TS2.

Transmission ECU 200 can iterate data collection and processing to actively learn the torque output necessary to maintain the commanded speed in step S520. This can comprise one or more subroutines for gathering data from wheel slip sensors, which can be integrated with, or subcomponents of, brake transceivers and sensors BS1-BS4. An acceleration sensor can be also included in sensor pack SP. User can suggest an initial gear selection via user interface UI, or the autonomous dock routine can comprise a default gear selection. Or, sensors provide feedback to the master controller, as above, to calculate an initial gear selection based on vehicle type, weight, vehicle upgrades, clutch type, etc. From there, control logic ramps the vehicle speed by maintaining or moving up or down in gears to maintain the commanded speed.

A proportional integral derivative (PID) controller, or like adaptive controller, can be used to learn gear selections for a particular vehicle. Master controller 100 or transmission ECU 200 can implement one of a feed-forward subroutine or a feedback subroutine to adjust the vehicle speed-control mechanism to maintain the calculated vehicle speed. Ramping techniques can be implemented to change gears faster at initiation of auto-dock, while implementing gear changes more slowly after a threshold vehicle speed is achieved. This is illustrated in FIG. 6, where clutch torque over time is illustrated in a ramped fashion.

Figure 5A:
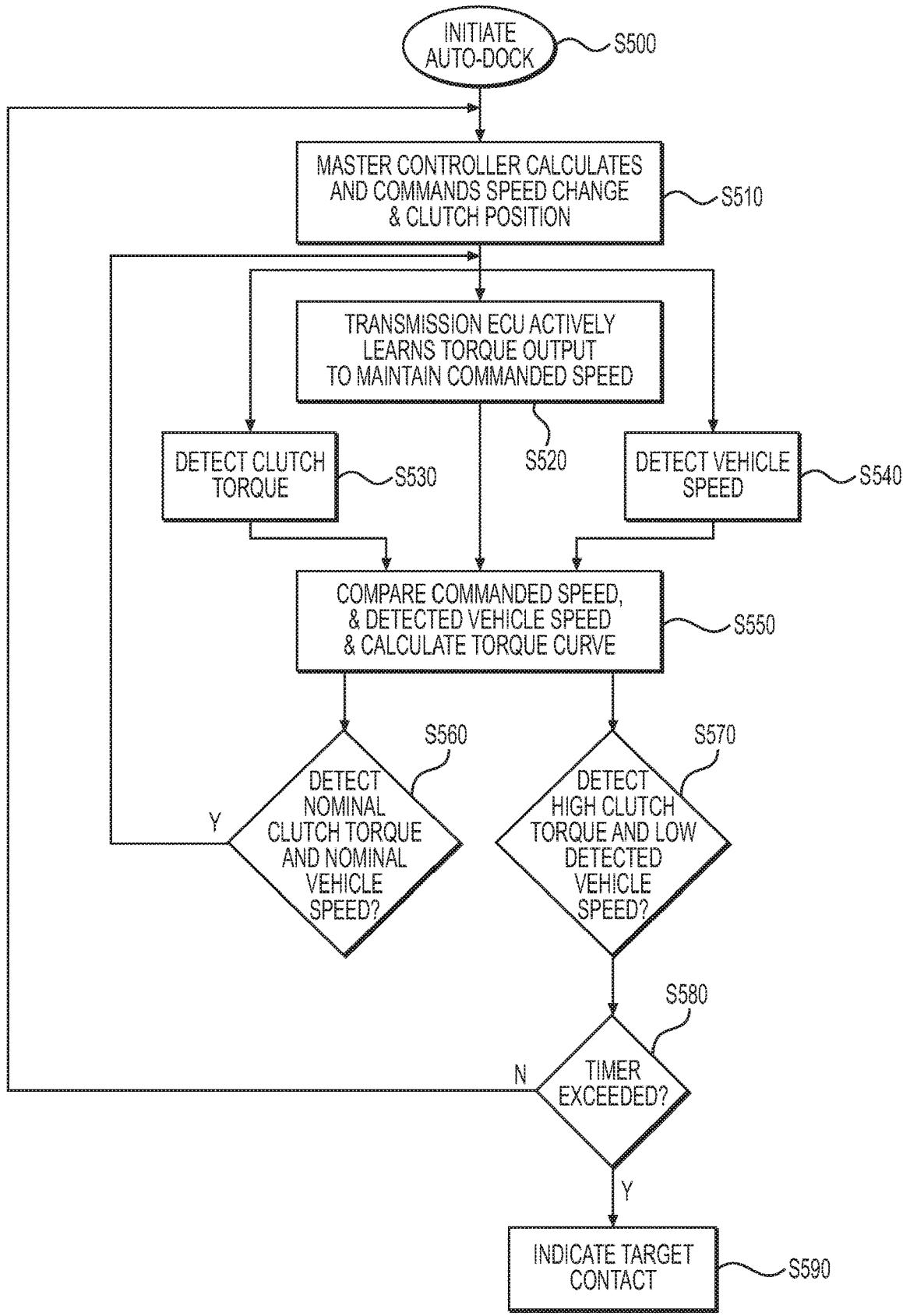
FIG. 5A is a flow diagram of an autonomous dock routine.
Figure 5B:
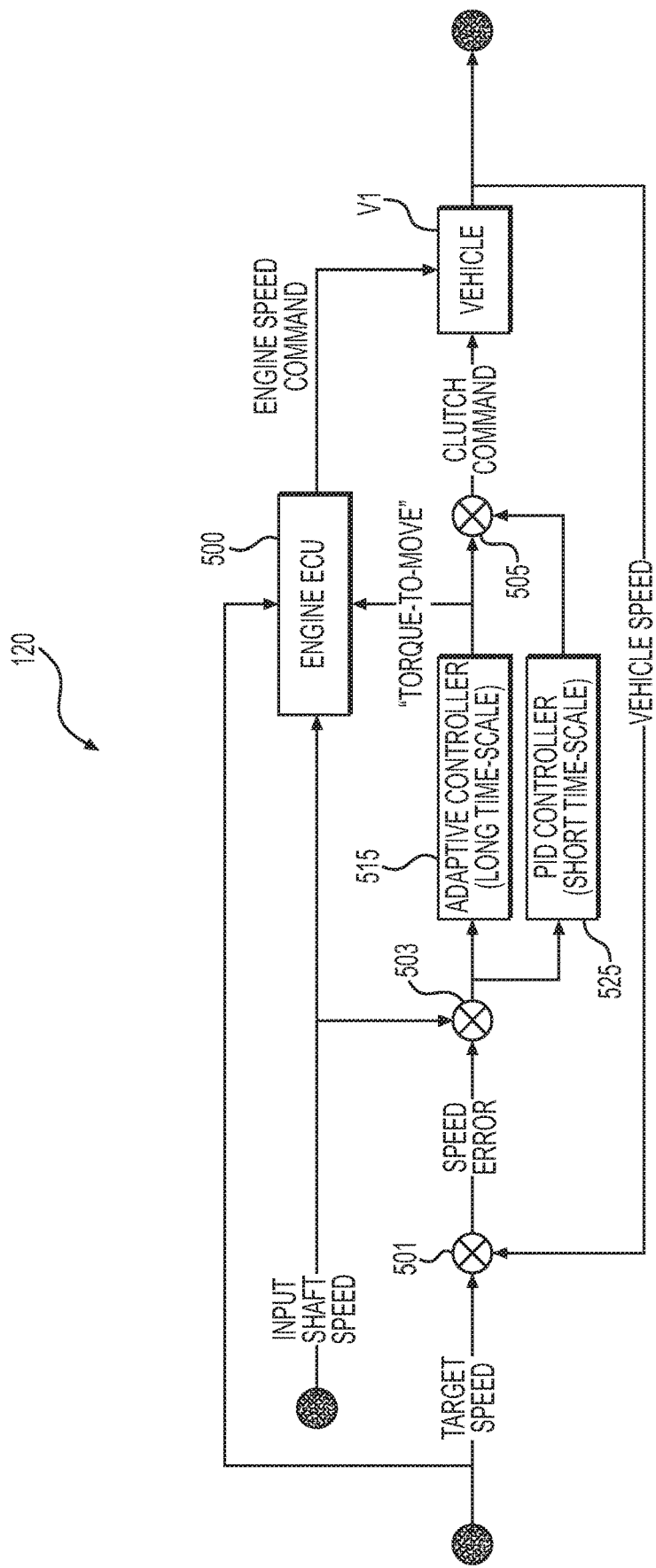
FIG. 5B is an explanatory layout for the processing of the autonomous dock routine within processor of master controller.

While FIG. 5A provides a flow diagram for an autonomous dock routine, FIG. 5B provides a control logic layout for a portion of the processing of the autonomous dock routine within processor 120 of master controller 100. Master controller receives input shaft speed data from transmission transceiver and sensor TS. Other shaft speeds can be monitored, such as drive shafts. In this example, engine ECU 500 is integrated in to the master controller processor 120. Engine ECU 500 is herein an engine command generator that uses the input shaft speed data as an input for generating the engine speed command. The target speed is also used for this purpose.

A comparator 501 also receives the target speed and an actual sensed vehicle speed and generates a speed error. The speed error is compared to the input shaft speed by comparator 503. Based on whether the vehicle is in the connection distance CD1 or closing distance CD2, the results of comparator 503 are forwarded. An adaptive controller is used for long time-scale vehicle speed commands, such as when the vehicle is beyond a threshold distance from the target TG1, TG2. The adaptive controller can be used during the below time period in FIG. 6A from initiation to point 7 and time t7. A feedforward or feedback technique can be used, as described below.

But when the closing distance is encountered below a threshold distance from the target TG1 or TG2, there is a short time-scale PID controller 525. Among other reasons, PID (proportional integral derivative) looping can be used to assist with the soft release of the target speed. The output of PID controller is fed to a comparator 505 that can implement the clutch actuation decision trees and flow diagrams of FIGS. 6C & 6D. A clutch command results from the decisions of comparator 505, and a clutch position can be chosen among, for example, open, locked (closed), slipping, at TtTP, or at MtTP. A clutch command is fed to clutch C of vehicle V1, and the routine iterates to make necessary adjustments.

There can be implemented greater vehicle control options, or different vehicle control options based on the determination that the vehicle is in a long time-scale distance from the target versus the short time-scale distance from the target. In the layout of FIG. 5B, clutch control is available during both long time-scale and short time-scale autonomous dock routines. But, during long time-scale autonomous dock routines, there are additional "torque-to-move" considerations for determining an amount of engine speed to command that could deviate from a baseline engine speed. In the short time-scale scenario, the engine speed could be held steady, or based on only the input shaft speed data, while the long time-scale scenario can ramp engine speed based on additional factors.

In FIG. 6, the auto-dock routine is selected at time zero, while the vehicle is parked or otherwise braked or stationary. The engine E outputs torque to the clutch C for transfer to the transmission T. Initiating the auto-dock routine causes a large amount of torque to cross through the clutch, with the torque reaching point 1. In this instance, the gear selection at the transmission T causes the torque output to overshoot the torque necessary to maintain the desired vehicle speed and the torque sensed by clutch transceiver and sensor CS is too high. That is, result of step S570 is that the detected clutch torque and the vehicle speed are not nominal, or within normal limits, with respect to the commanded parameters. Based on the decision step S560, the system loops back for updated master controller calculations in step S510. System adjustments are made, including changing transmission gear, and the torque across the clutch reduces from point 1 to point 2. When necessary, engine speed and throttle position can be changed along with the gearing. Now, the torque across the clutch is too low, so another transmission gear change is made to bring the torque across the clutch to point 3. Being near the target vehicle speed and target torque output, another gear change occurs and brings the torque across the clutch to point 4. From point 4 to 5, the torque is largely stable. The slope of the line from point zero to point 1 is steeper, and the selection is held for a shorter duration (t1) than the gear selection duration (|t2−t1|>t1) for point 1 to point 2. The gear selection for the duration between point 2 and point 3 results in a lower slope (lower rate of change) and longer duration than was had from point 1 to point 2. So, |t3−t2|>|t2−t1|. Likewise, with time from auto-dock selection increasing, the slope of the torque change from point 3 to point 4 is lower and longer in duration than from point 2 to point 3 (|t4−t3|>|t3−t2|). Having found the ideal torque across the clutch to maintain the vehicle speed, from point 4 to point 5, no gear selections are necessary and the vehicle moves at or near the commanded speed. That is, a nominal vehicle speed is detected in step S560 and the master controller-commanded speed is maintained.

Optionally, when using both a connection distance CD1 and a closing distance CD2, point 7 can be included to make vehicle speed command adjustments to slow the vehicle as it traverses the closing distance CD2. This enables a vehicle speed that is too great for the impact limits of the target from point 4 to point 7, which permits faster-time dockings. Then, the vehicle speed from point 7 to point 5 is controlled in consideration of target impact limits.

At point 5, one of two things occurs: the target is reached or an obstacle is encountered. The torque across the clutch increases for a limited duration according to a timer, as in step S580. The time for the increase in clutch torque is substantially less than the times at gear selections corresponding to points 1-5 (|t6−t5|<<t1). The learned gear selection and operating parameters of the auto-dock routine can be stored in the memory 110 or transmission ECU 200 memory for later re-use.

The auto-dock routine can integrate aspects of urge-to-move techniques or auto-launch techniques. However, several aspects can be re-mapped to perform an "ultra-creep" vehicle motion. The vehicle speed is selected so that the vehicle has enough momentum to lift the trailer during coupling, but not so much to harm the kingpin. Likewise, the momentum is enough to push on a dock or other target, yet not cause damage to the target.

Figure 7A:
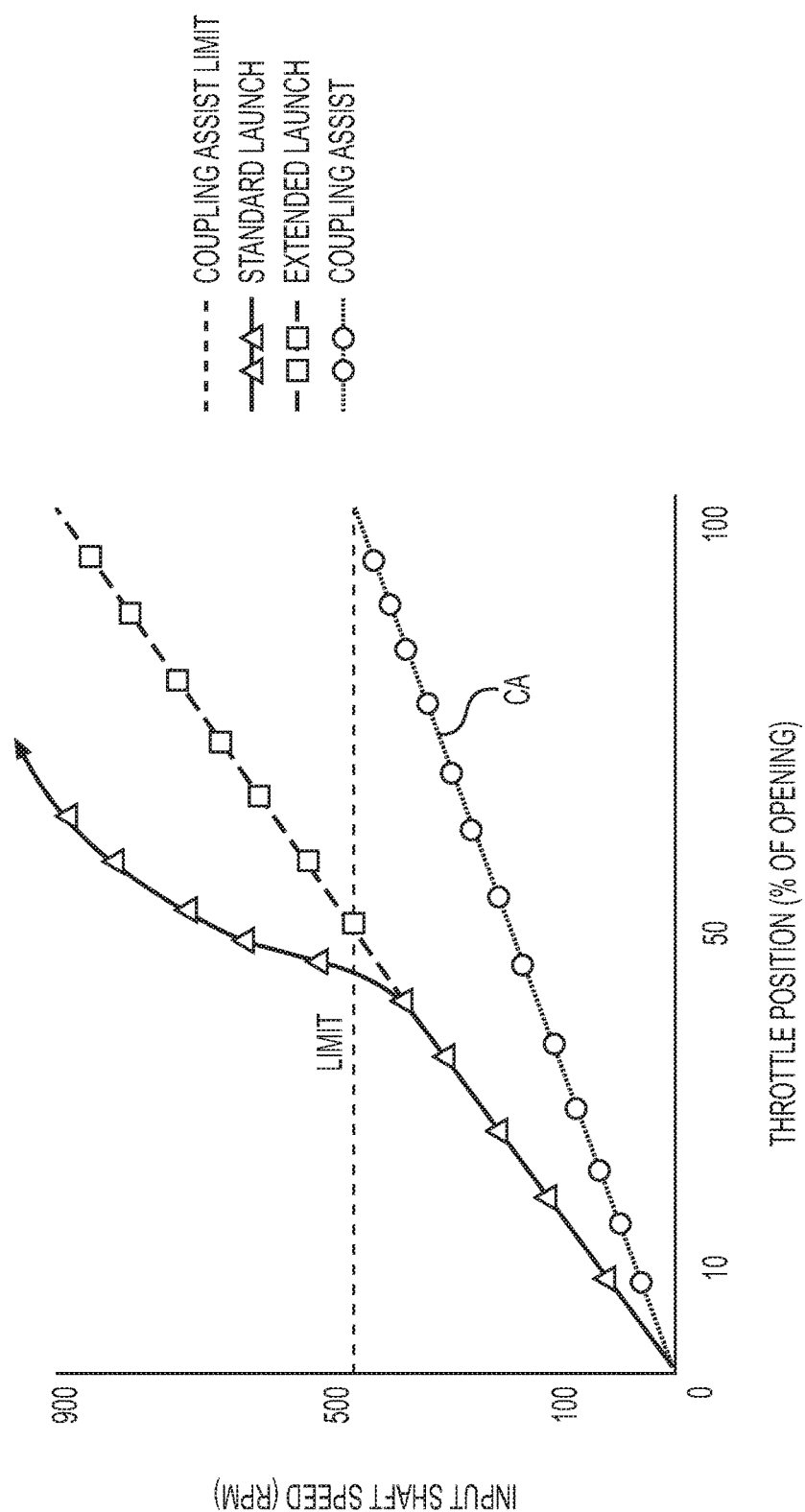
FIGS. 7A and 7B are explanatory graphs of throttle positions.
Figure 7B:
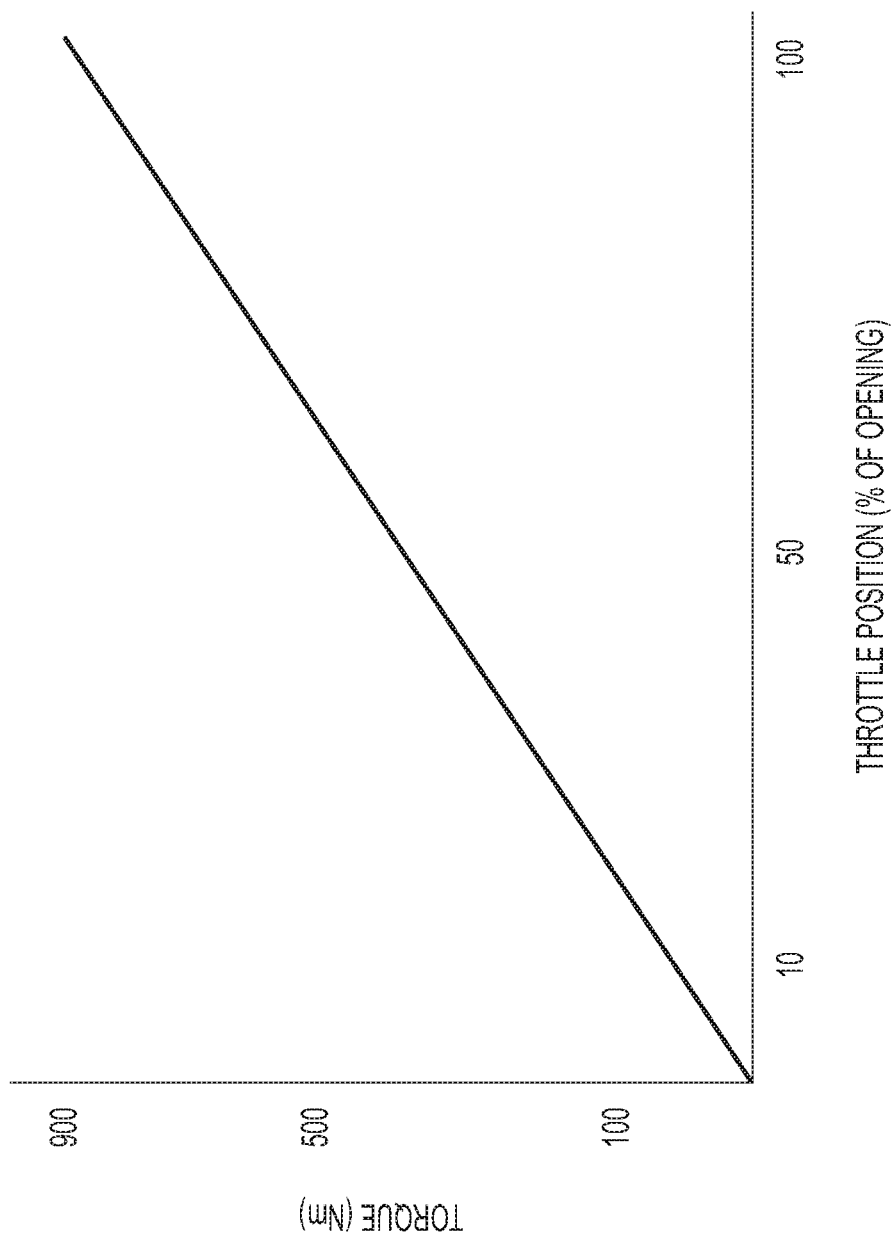

A comparative example of auto-launch and ultra-creep is shown in FIG. 7A. Example input shaft speeds in rotations per minute (RPMs) for a transmission are plotted against sample throttle positions. The throttle T2 can be opened a certain percentage, from zero to 100%. The amount of air fed to engine E in this example impacts the torque output, in Newton meters, from the engine, as seen in FIG. 7B. The torque output impacts the input shaft speed because more torque output spins the input shaft more. In ultra-creep mode, during the auto-dock routine, it is beneficial in this example to limit the input shaft speed to 500 RPMs. This coupling assist limit prevents the vehicle from moving with too much force for impacting the target, and so the coupling assist limit can change for the vehicle from target to target. Using 500 RPMs as an upper limit, the throttle positions are mapped for coupling assist. The gradual slope allows the master controller 100 a finer range of control over the vehicle, because a large throttle response range corresponds to a small change in input shaft speed. In comparison, standard launch and extended launch have steeper slopes to increase the input shaft speed to higher RPMS. Standard launch and extended launch can be understood to have higher speeds of operations.

As above, the actual vehicle speed is detected in step S540. Master controller can iteratively compare the commanded vehicle speed to the detected actual vehicle speed in step S550. The comparison yields a positive or negative difference that indicates whether a transmission gear change is necessary. When throttle maps and engine speeds are linked in, the positive or negative difference can indicate a need to open or close the throttle or increase or decrease engine speed. Additionally, the clutch torque detection is mapped to form a calculated torque curve, as in FIGS. 6A & 6B.

Figure 6A:
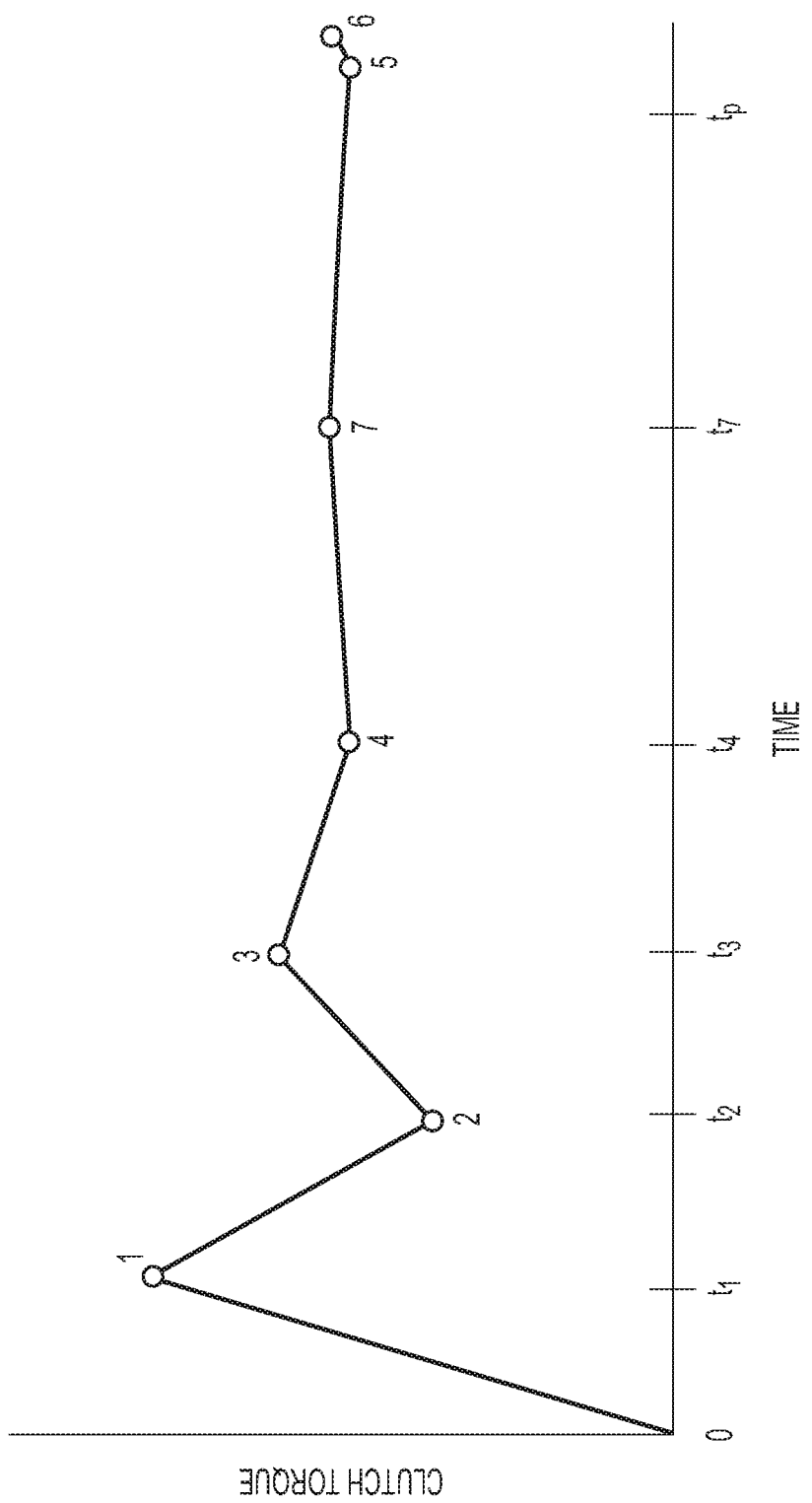
FIG. 6A is a graph of clutch torque over time.
Figure 6B:
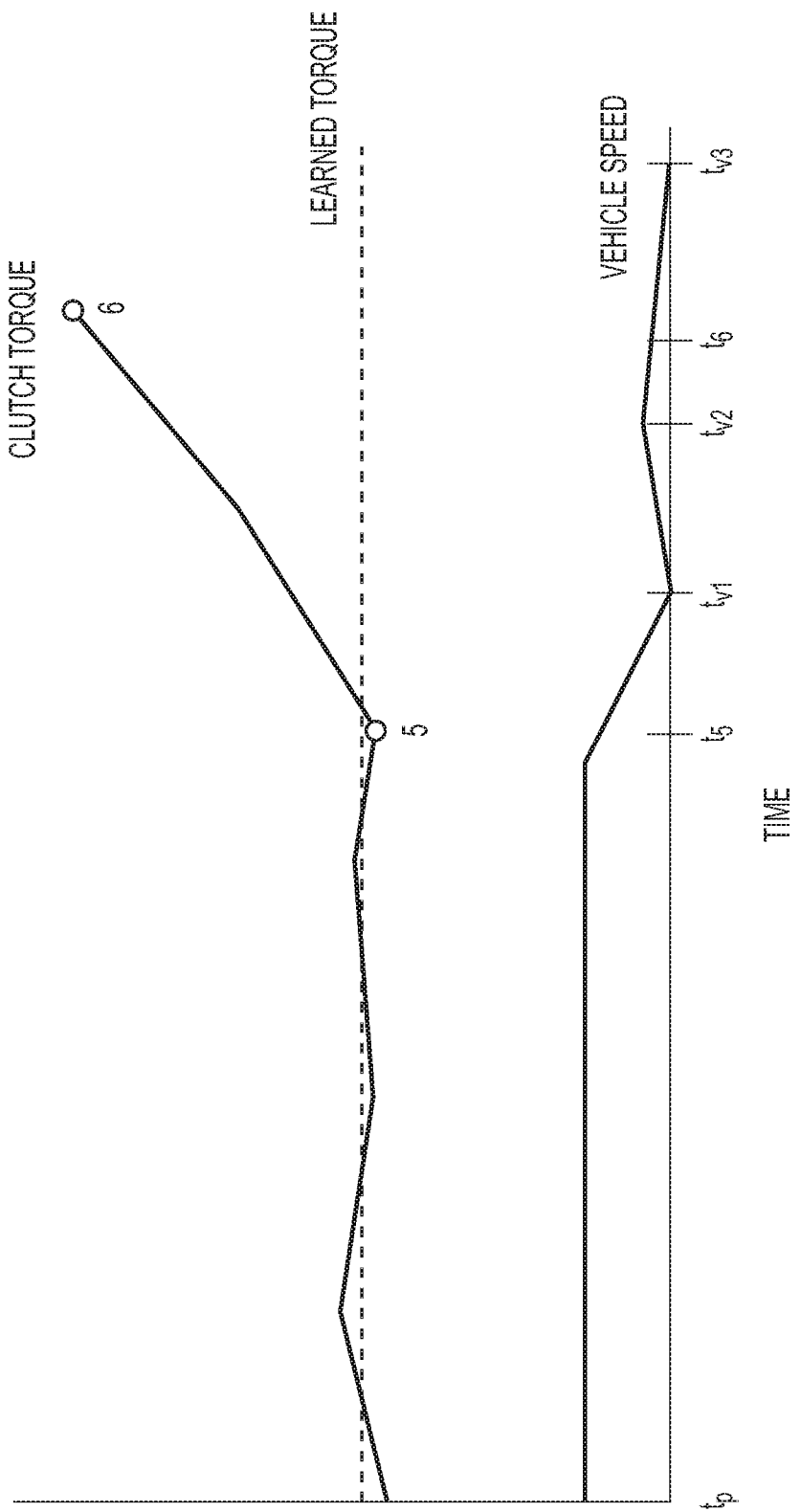
FIG. 6B is a graph of clutch torque and vehicle speed over time.

When the comparisons of step S550 result in the determination of step S570, a new adjustment is made by the master controller S510. So, when the commanded vehicle speed is compared to the detected actual vehicle speed and the result indicates that the detected actual vehicle speed is below a speed threshold, and when the actual torque amount transferred across the clutch exceeds a torque threshold, the master controller commands an increase in vehicle speed. As seen in FIGS. 6A & 6B, the command to increase vehicle speed results in a very slight change in torque across the clutch compared to other gear changes during the ultra-creep start-off sequence. And, the duration for the increase is very short. But, at the same time, the vehicle speed is decreasing. A timer is implemented to limit the duration of the increase in vehicle speed, and the auto-dock algorithm monitors whether the timer is exceeded in determination step S580. When the timer is exceeded, the auto-dock routine indicates target contact in step S590. This can comprise a tone or other audible notice, a visual indicator, or the initiation of neutral gear or electronic brakes. At times, the vehicle can encounter an obstacle that is not the target and that is not overcome by the increase in speed, and the user must account for the obstacle. Common obstacles comprise chuckholes. If the target is highly tolerant to impacts the coupling assist limit can be set higher, and the vehicle can accommodate larger chuckholes than when the target has low impact resistance.

Returning to FIG. 6B, a section of time, starting at sample point tp, compares clutch torque and vehicle speed. As above, at point 5, the vehicle encounters the target, which can be a loading or unloading dock. The torque across the clutch increases steeply to point 6 to deviate from the learned torque (points 4 to 5). The torque across the clutch increases at a rate of change indicating that the torque is not coupling to the driveline as intended, rather it is spinning up the clutch. Reaching a target threshold for impact causes the master controller 100 to cut vehicle speed commands, as by entering neutral or another park sequence. The clutch torque terminates after point 6. Meanwhile, the sensed vehicle speed, which has likewise been steady from time t4 to time t5, drops.

Whether sensed by wheel slip monitors or another acceleration device, the vehicle speed drops from time t5 to time tv1. With the clutch torque increasing, the wheels W1-W4 can slip or the vehicle can lurch, indicating a slight acceleration from time tv1 to tv2. Anti-lock braking or anti-slip mechanisms can initiate and slow the wheels W1-W4, or resistance from the target itself causes the vehicle speed to indicate a decrease from time tv2 to t6. When the target is padded, the vehicle can compress the padding, permitting acceleration during compression (time tv1 to tv2), but ultimately yielding a stopped or substantially stopped vehicle. The vehicle is substantially stopped, but for harmonics related to the damping characteristics of the compressed target padding. These characteristics can be part of an expected vehicle speed profile to indicate target contact. To detect impact with the target, versus a chuckhole or other obstacle, it is possible to compute an expected vehicle speed profile to approximate the impact situation and vehicle characteristics. For example, rubber versus foam padding or limited slip differential versus wheel slip. So, the profiles of FIG. 6B permit the implementation of several variant versions of instructions for exiting the autonomous docking routine: when comparing the commanded vehicle speed to the detected actual vehicle speed indicates that the vehicle has stopped moving in combination with an indication that the actual torque amount transferred across the clutch exceeds a torque threshold; or when comparing the commanded vehicle speed to the detected actual vehicle speed indicates that the vehicle has stopped moving after experiencing a wheel slip and when the actual torque amount transferred across the clutch exceeds a torque threshold; or while applying a timer to limit the amount of time for commanding the increase in vehicle speed, comparing the commanded vehicle speed to the detected actual vehicle speed for an indication that the detected actual vehicle speed is at or substantially at zero; or comparing the commanded vehicle speed to the detected actual vehicle speed for an indication that the vehicle speed has decreased and the actual torque amount transferred across the clutch has increased at or above a torque threshold rate of change.

Having several alternative ways to detect target impact, torque across the clutch is cut off at time t6. Then, the vehicle speed decreases to zero by time tv3. The vehicle is considered docked or parked. The master controller 100 can command an exit from the autonomous dock routine.

Several variants over the above routine can be accommodated.

Example: Clutch Routine

Figure 6C:
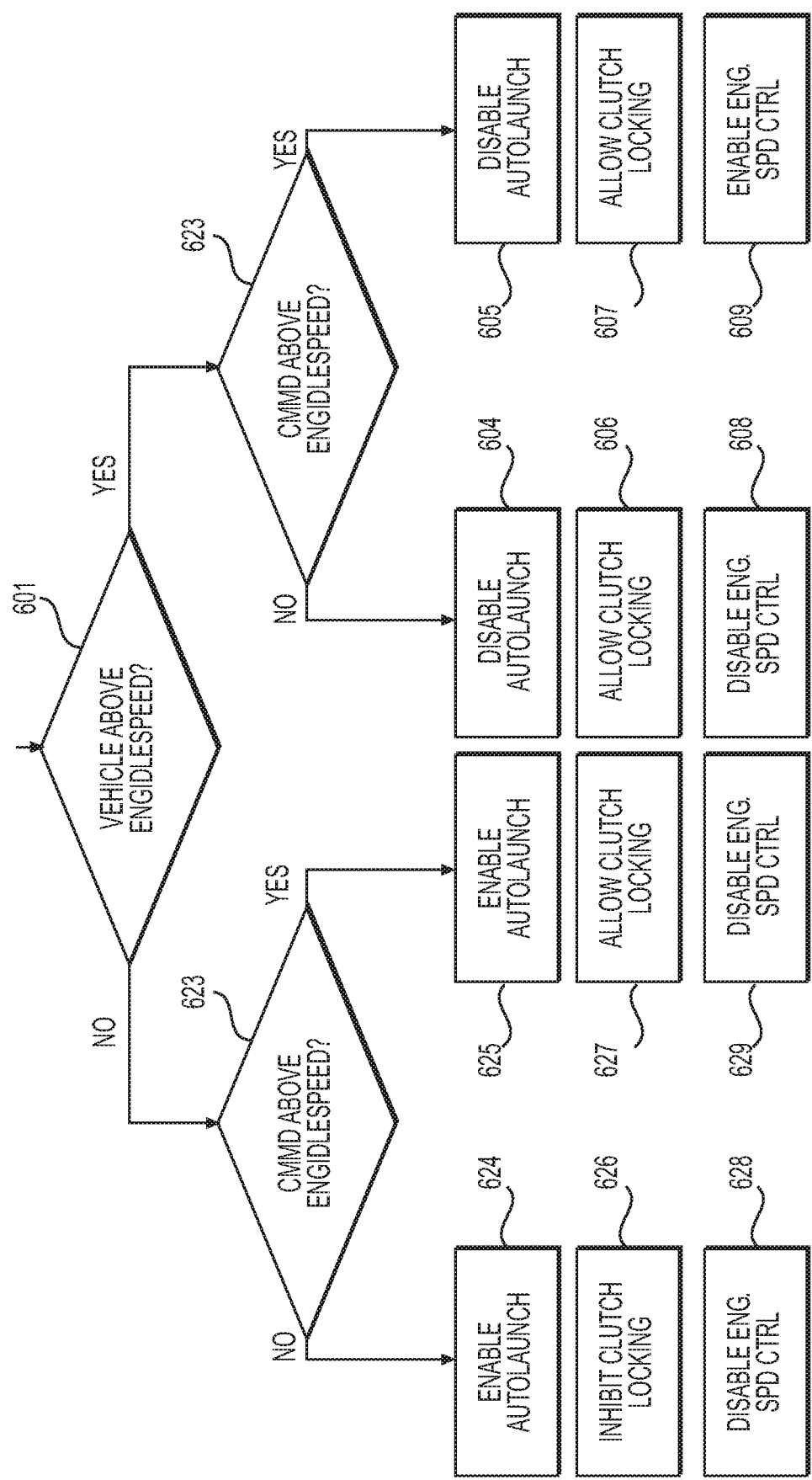
FIGS. 6C & 6D are examples of a clutch and vehicle control decision tree.

As shown in FIG. 6C, a clutch routine decision tree is shown for deciding when to allow or inhibit clutch locking. Whether or not the clutch locks determines the torque amount across the clutch. If the clutch C is open with respect to the torque input, then the clutch can slip or the clutch fails to transfer the full torque from the torque source. As above, a torque source can be an engine flywheel or a hybrid vehicle motor. The clutch routine permits greater control over the amount of torque in the system.

In step 601, master controller 100 or clutch ECU 300 determines if the vehicle is above engine idle speed. If it is, the clutch is allowed to lock, as shown in blocks 606 & 607 and the auto-launch feature described in FIG. 7A is disabled in blocks 604 & 605. A decision tree at step 603 determines if the commanded speed from step S510 is above engine idle speed. If it is, then engine speed commands are enabled in block 609, and engine speed commands are calculated in step S510 to replace the disabled auto-launch capabilities.

If the commanded speed is not above engine idle speed, but the vehicle speed is, then from step 603, the auto-launch is disabled in block 604, the clutch is allowed to lock in block 606, and engine speed control is disabled in block 608. Opening and closing the clutch in block 606 and making transmission gear selection controls the vehicle speed.

If the vehicle speed is not above engine idle speed in step 601, but the commanded speed is above engine idle speed in step 623, then the vehicle speed needs to increase. So, auto-launch can be enabled in block 625. Auto-launch can be remapped, as outlined in FIG. 7A, to correspond to the auto-dock routine. The clutch is permitted to lock in block 627, but engine speed control is disabled in block 629 in favor of making gear selections on the transmission T and in favor of making throttle T2 position changes.

If vehicle speed is not above engine idle speed in block 601 and the commanded speed is not above engine idle speed in block 623, then the clutch is inhibited from locking in block 626. A PID controller can be applied to modulate the clutch C positions to control torque transfer, and so engine speed control is disabled in block 628. The remapped auto-launch of FIG. 7A can be implemented, and so auto-launch functionality can be enabled in block 624.

Because auto-launch can be a short-duration event, and parking or docking can take longer than an ordinary vehicle launch, it is possible to set a new timer, or over-ride any timer that is part of standard auto-launch. This can be seen in FIG. 7A on the extended launch line. When the commanded speed and vehicle conditions require, the remapped throttle positions are not enough to control the vehicle speed, and the auto-launch features can be used as part of the auto-dock routine. As implied in FIG. 7A, standard auto-launch is used up to a limit. After that limit, the throttle positions and input shaft speeds are uninhibited, and can comport with the full vehicle range. But, during extended launch, the increased input shaft speed of standard auto-launch can be applied in the autonomous docking routine to account for vehicles with, for example, heavier loads or higher impact-tolerant targets. Otherwise, remapped throttle positions are used as part of the auto-dock routing coupling assist feature.

Example: Coupling with Added Sensor Packs

One way to handle the issue of backing to a loading dock, parking, or to connect the $5^{th}$ wheel with the kingpin, is to measure the connection distance CD1 between the moving part and the stationary part of the system. One option integrates transceivers TX1, TX2, . . . TXN to measure the connection distance with the transmission T. Transceivers can comprise one or more of a VORAD (Vehicle On-board RADAR) system, a global positioning system (GPS), real-time kinematics system (RTK), camera system, or radio-frequency system (RF device), among others.

Figure 8:
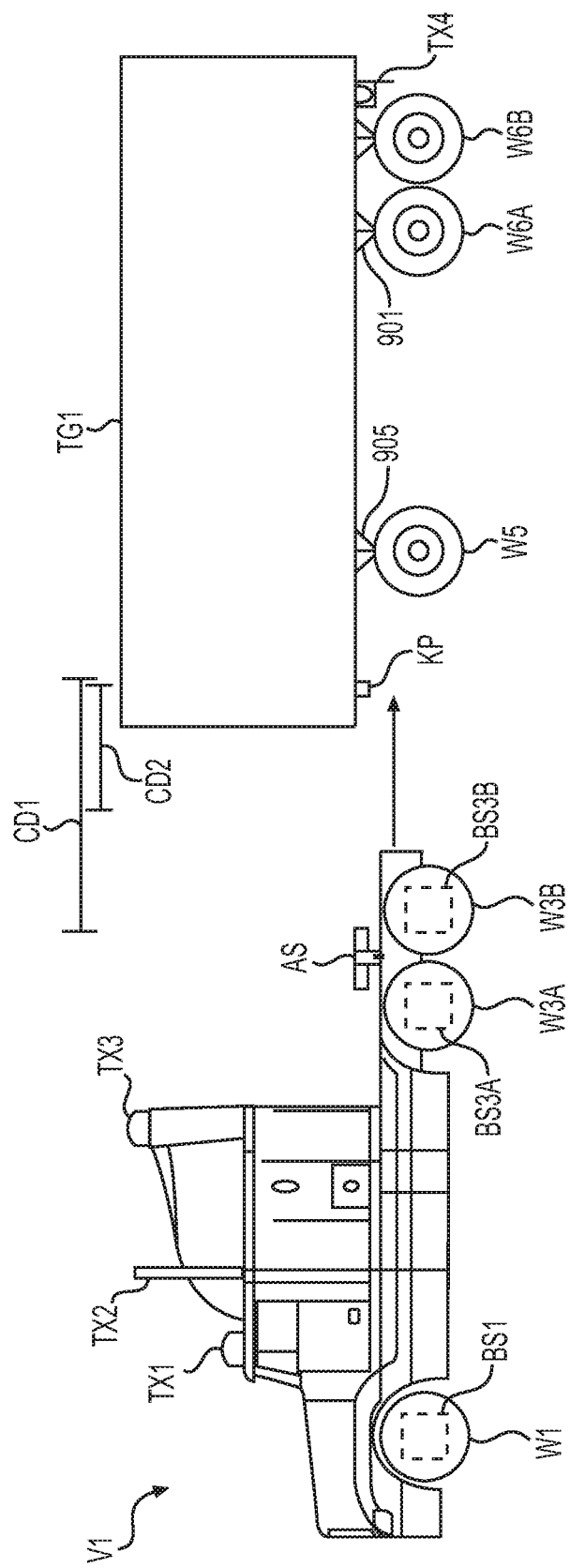
FIG. 8 is an example of a vehicle relative to a target.
Figure 9A:
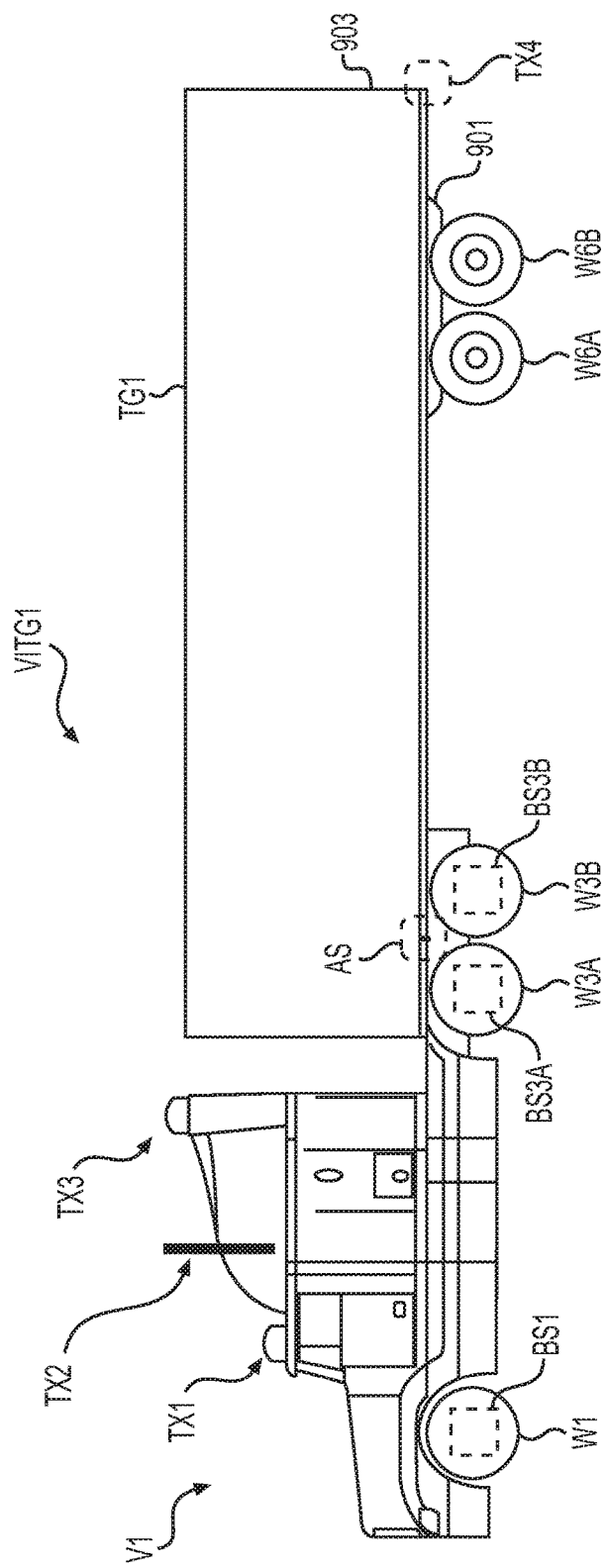
FIG. 9A is an example of an alternative vehicle.
Figure 9B:
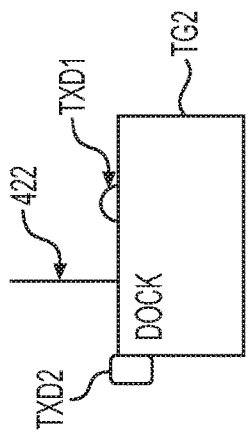
FIG. 9B is an example of an alternative target.

As shown in FIGS. 8 and 9A, transceivers TX1, TX2, . . . TXN are distributed around the vehicle V1 and trailer TG1. The trailer TG1 is the target in FIG. 8, while a loading or unloading dock TG2 is the target in FIG. 9B. In FIG. 8, the vehicle V1 is coupling to the trailer T1. In FIG. 9A, the vehicle V1 is combined with the trailer T1 to form vehicle V1TG1. By way of example, transceiver TX4 comprises a VORAD placed on or near each rear axle 901 or near the end 903 of the trailer TG1. Transceiver TX4 can yield data points T1 and T2 in FIG. 9C. Transceiver TX4 can be in other locations on trailer TG1, and duplicated for redundancy or to enable triangulation, straight-line, or other location and trajectory techniques. Transceiver TX4 can be located near axle mountings 901 or 905 for trailer wheels W5, W6A, W6B. When placed near axle mountings 901, 905, transceiver TX4 can be programmed to transmit the distance from its location to the end 903 of the vehicle.

Vehicle V1 can comprise wheels W1, W3A, W3B with corresponding wheels on the opposite side of the vehicle. Brake transceivers and sensors BS1, BS3A, BS3B and ones corresponding to the opposite vehicle side can also be included. Wheel acceleration, wheel slip, vehicle grade, brake engagement, among other conditions, can be sensed by the brake transceivers and sensors and conveyed to master controller 100. An angle sensor AS can be embedded in the $5^{th}$ wheel and can cooperate with the kingpin KP to calculate the angle of the trailer TG1 with respect to the vehicle V1.

Vehicle V1 can comprise additional transceivers. In this example, transceivers TX1 and TX3 are GPS devices and transceiver TX2 is a radio antenna.

Numerous combinations of transceivers are possible and compatible with the above variations of the autonomous dock routine. More or fewer transceivers can be used, and the below examples are non-limiting.

Returning to FIG. 3, transceivers TX1 (a GPS device) and TX2 (a RADAR device) can feed vehicle information to master controller 100. The transceiver TX1 can supply location, vehicle speed, trajectory, obstacle, vehicle grade, mu slip or other information to master controller 100. The transceiver TX2 can supply additional or corroborating data, such as vehicle speed, trajectory, and other terrain information.

Or, master controller 100 can use the information from the transceivers TX1, TX2 to access or derive data. For example, the data from the transceivers can be used for on-board calculations for vehicle speed commands or trajectory control. Or, master controller 100 can coordinate data processing with a remote computing device. For example, wireless or other internet based communication architectures can supply additional data or data processing to master controller 100 by accessing stationary computing systems with tangible storage devices and supplying the additional data or processing results to master controller 100. Master controller 100 or the remote computing device can also corroborate sensed data from other transceivers and sensors in sensor pack SP or the other transceivers and sensors (AS, SS, BS1-BS4, etc.) outlined in FIGS. 2A & 2B.

Figure 4A:
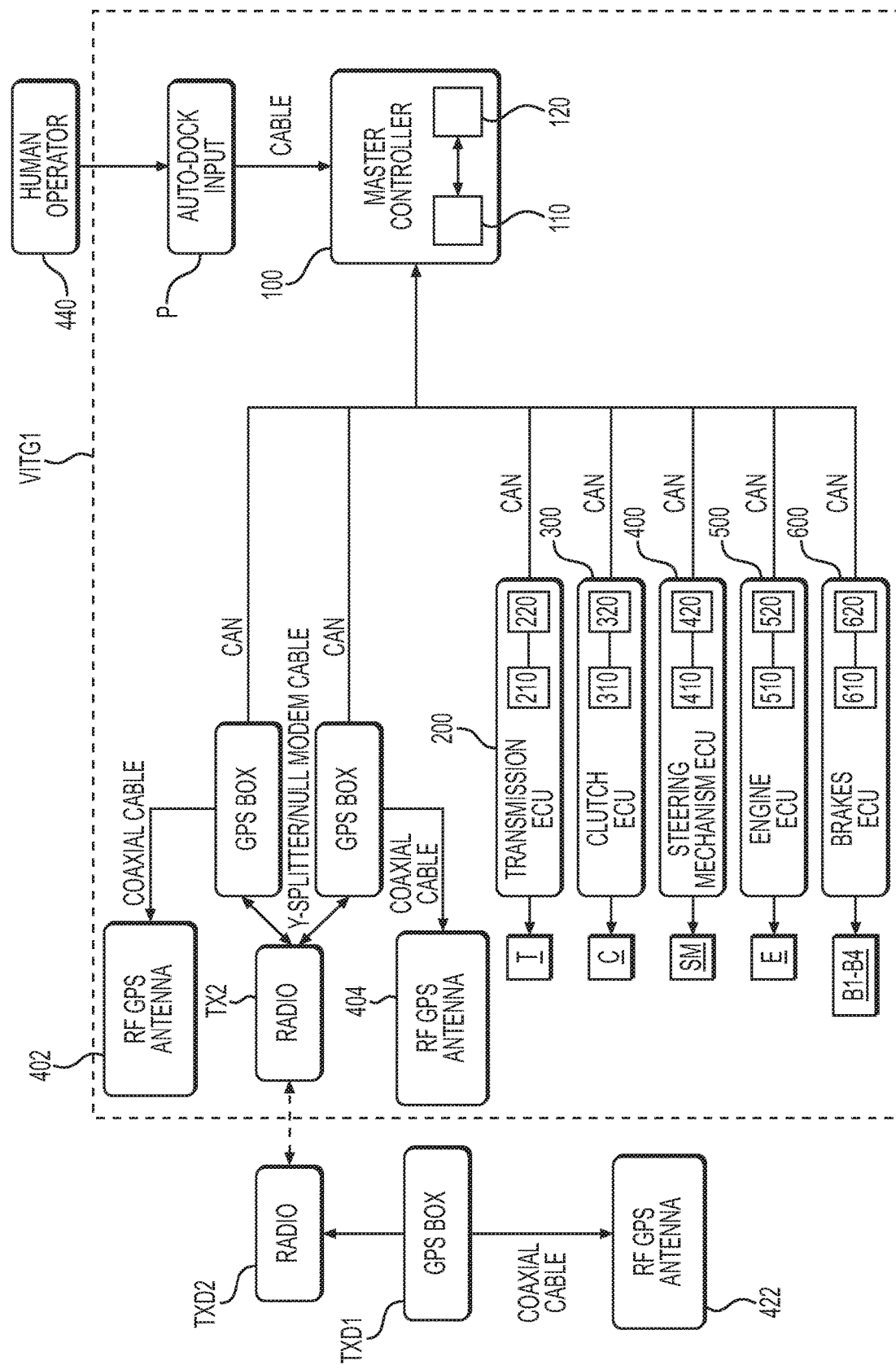
FIGS. 4A & 4B are alternative examples of system control architectures.

Turning to FIG. 4A, an alternate layout for implementing an autonomous dock routine is shown. Vehicle V1TG1 comprises the mechanisms out lined in FIG. 2A or 2B and FIGS. 9A and 9B. A human operator 440 interacts with the vehicle V1TG1 by pressing a docking dash button corresponding to auto-dock input P. A cable routes the interaction to master controller 100. The processor 120 implements the autonomous dock routine stored in the memory 110. Sensor and other data, such as data from other system ECUs is collected in the memory 110 for processing by processor 120. A controller area network CAN facilitates collection of data and distribution of commands.

Two GPS-type transceivers TX1 & TX3 are included on the vehicle V1TG1. Positioning redundancy can be one purpose, but another purpose is to provide two location points to establish a straight-line trajectory for the vehicle. Each transceiver TX1 & TX3 can comprise a GPS box for receiving queries from the master controller 100. Master controller can request that the transceivers TX1 & TX3 obtain and share position data. Other data, such as terrain data, can be obtained and shared by the transceivers TX1 & TX3. In this example, the GPS boxes are linked via coaxial cable to separate radio frequency antennas 402, 404. The radio frequency antennas can perform a transmit or receive function for the transceivers TX1, TX3 while the GPS boxes of transceivers TX1 & TX3 provide processing capacity on the coordinates obtained by the radio antennas. The radio frequency antennas 402, 404 can be configured to interface with a satellite, while separate transceiver TX2 comprises a radio configured to interface with the target transceiver TXD2.

Target transceivers TXD2 & TXD1 can be affiliated with a target TG2, such as a loading dock. The loading dock can comprise more than one transceiver device TXD1, TXD2, . . . to establish two or more points for establishing the orientation or other features of the target TG1. In the illustrated example, short range communication can be established between the radios of transceivers TXD2 and TX2. The radios can share position or other information, or can communicate or share data related to the connection distance CD1 or the closing distance CD2. Transceiver TXD1 can comprise a GPS device having a main processing GPS box connected via coaxial cable to RF GPS antenna 422. As above, the GPS box can perform processing capabilities to derive location information while the antenna communicates with, for example, a satellite.

Figure 4B:
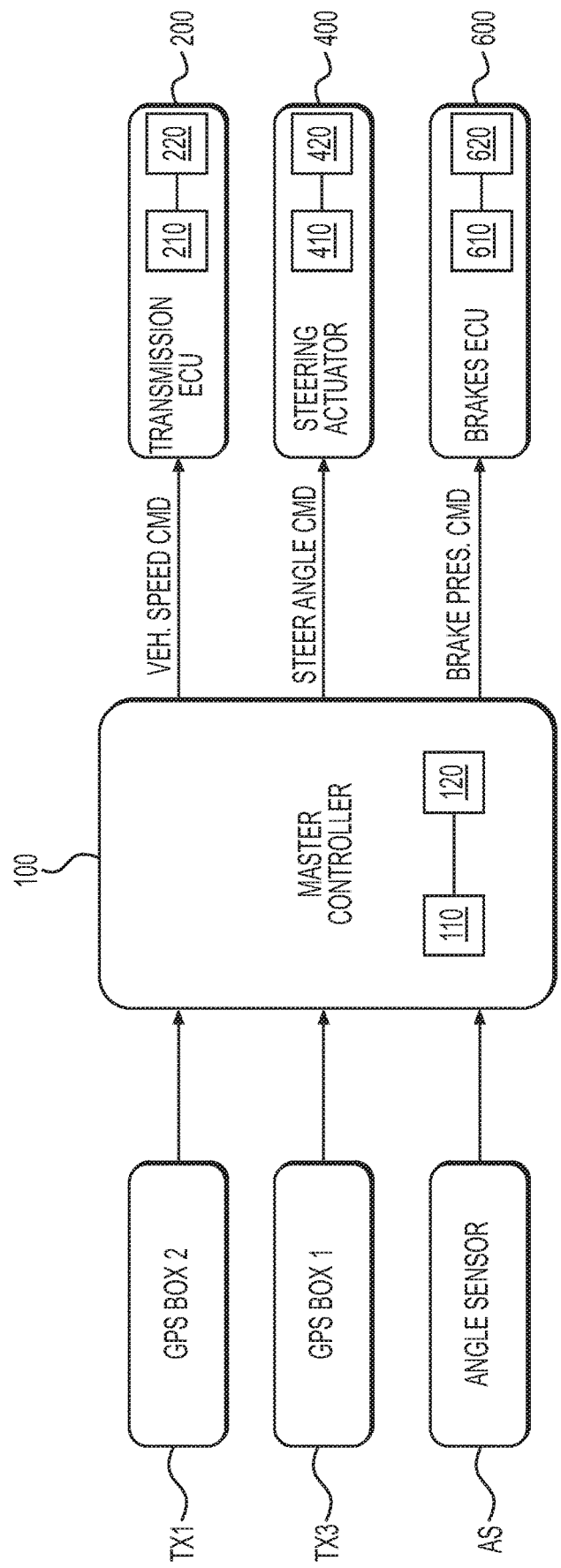

In a more simplified scheme, shown in FIG. 4B, the transceivers TX1 & TX3 are paired with angle sensor AS. The transceivers TX1 & TX3 can be used to determine two location points for deriving a straight-line trajectory for the vehicle V1 or V1TG1. The angle sensor can be used to determine a relative angle of the vehicle V1 with respect to the target TG1. The master controller 100 can receive and store the relative angle data and the location points in the memory 110 and the processor 120 can process the relative angle data and the location points to establish a trajectory for autonomously docking vehicle V1TG1. Master controller 100 can issue vehicle speed commands to transmission ECU 200, steer angle commands to steering mechanism ECU 400, and brake pressure commands to brakes ECU 600. The ECUs can be pass-through devices for the master controller commands, or the ECUs can comprise their own memory and processing devices to execute further subroutines and issue further sub-commands based on the master controller commands.

Example: $5^{th}$ Wheel to Kingpin Autonomous Docking

The teachings of the above examples apply equally to this example. The present example builds on the above teachings by adding transceivers to the autonomous dock routine.

The vehicle uses, as an example, a transmission T comprising an automated variator coupled with a planetary based transmission system. The integrated system controls vehicle speed such that the vehicle V1 slows as the connection distance CD1 decreases to the point where the vehicle stops, which is just as just as the kingpin KP and 5$^{th}$ wheel click.

In a first aspect, a single transceiver TX1 is used to know the location of vehicle V1. The location of target TG1 is preprogrammed or input to master controller 100. For example, the target TG1 is at a particular bay, and the bay has known coordinates and characteristics. Master controller 100 accesses the known coordinates and characteristics whether by sending an inquiry to one or more transceivers TX4 of target TG1, or via the preprogrammed or input coordinates. Together with sensed data from transceiver TX1 and optionally with other on-board sensors from FIGS. 2A & 2B, an initial connection distance CD1 is calculated. The GPS of transceiver TX1 can iteratively supply master controller 100 with updated vehicle location information. Master controller 100 can issue speed control commands or other commands based on the updated vehicle location information. For example, the vehicle speed can be steady, or within nominal for the whole of the connection distance CD1. Or, with the help of transceiver TX1, the master controller can determine the vehicle position so that the vehicle speed can transition at point 7 to a new vehicle speed for the closing distance CD2.

A second option for connecting a kingpin PF to a 5$^{th}$ wheel can comprise the use of two or more transceivers TX1, TX3. Having two location sensors permits the extrapolation of a straight-line trajectory for the vehicle V1. Now, inputting further data, such as distances around the straight line, permits the autonomous dock routine to comprise additional functionality. For example, knowing the location of the 5$^{th}$ wheel with respect to the back end of the vehicle V1 allows the master controller 100 to incorporate calculations and precise vehicle speed and vehicle steering control to connect the 5$^{th}$ wheel and kingpin KP.

Combining the second option with transceivers TX4 and a mirror-image transceiver TX5 on the rear of the target TG1 permits the extrapolation of a second straight line. Determining, inputting, or calculating the location of other distances around the second straight line permits even more sophisticated autonomous dock routine. Now, the location of the kingpin KP can be determined without relation to a particular bay or user input. With the transceivers TX4 and TX5 (additional transceivers optional), the vehicle V1 transceivers Tx1, TX2, TX3, etc. can communicate with the target transceivers and to determine the intersection of the first straight line and the second straight line, and extrapolate the locations of the kingpin KP and 5$^{th}$ wheel for coordinated and precise vehicle to target coupling.

When the target TG1 is coupled to the vehicle V1 to form vehicle V1TG1, the angle sensor can be used to extrapolate an angle of the trailer with respect to the truck. An identification scheme can be implemented so that when a trailer is connected to the truck it automatically updates the system with its dimensions. Master controller 100 can incorporate angle data to know the location of the trailer without needing to rely on trailer transceivers TX4, TX5. Vehicle V1 can have trailer information or dock information, such as location of dock, dimensions of trailer, dimensions of dock, etc., stored or inputted to master controller 100. A dashboard input, such as a keyboard, or a remote computer device via one of transceivers TX1-TX3, can interface with master controller 100 to provide location information for target TG2. Trajectories can be generated as below.

In another alternative, a VORAD measurement system indicates the connection distance CD1 over a CAN or similar based system to be used to control the transmission T. The transmission T is computer controlled, as by transmission transceiver and sensor TS coupled with transmission ECU 200 and master controller 100. As above, master controller 100 can comprise a subroutine or allocation programming to comprise the transmission ECU 200, or the transmission ECU 200 can be a separate component in communication with the master controller 100. In either case, the master controller 100 devises a vehicle speed and the computer-controlled transmission T operates to implement the devised and commanded vehicle speed. For this discussion, the master controller 100 is said to issue commands which pass through transmission ECU 200. However, it is possible that transmission ECU 200 receives requests from the master controller 100 and transmission ECU 200 devises commands and control schemes for the transmission T based on requests from the master controller 100.

Commands gradually slews the variator to slow the vehicle down at a predetermined rate. As the connection distance CD1 reduces further to a closing distance CD2, typically three to five feet, the masterclutch system can begin to disengage at a controlled rate such that vehicle speed continues to reduce. If vehicle speed increases, the computer control emits active wheel braking requests to keep vehicle speed proportionally reduced as distance decreases. This ultimately brings the vehicle to a full stop as the trailer touches the loading dock, as by full master clutch disengagement and active braking. The operator may override the system by a button indication. The computer control can be integrated to augment an existing ULTRASHIFT or ULTRASHIFT Plus land vehicle transmission and parts thereof manufactured by Eaton Corporation of Cleveland, Ohio. The augmentations can also be applied to other computer-controlled transmission systems.

Another way to handle measurement of the connection distance CD1 and closing distance CD2 is to rely on an externally provided GPS Latitude and Longitude navigation system instead of the VORAD. For example, a Real Time Kinematic Unit (RTK), or other RF or GPS device can position the vehicle for an initial location fixed within 10 cm of the targeted hard stop position. The high positioning accuracy permits quick vehicle motion across the connection distance CD1, a shorter closing distance CD2, and resolves the "unacceptable amount of time" issue for traversing the connection distance CD1.

The driver selects reverse R on the user interface UI, confirms gear engagement on the display, and then buttons down the gear selector GS to activate the autonomous feature. Other integrated safety checks can occur, such as confirming that the parking brake is off, a user foot brake is activated by a user, a throttle pedal is not depressed, etc. Conversely, certain inputs by the user or system can cause an exit from the autonomous dock routine, such as excessive vehicle speed detection or certain user inputs to user interface UI, for example user brake UB activation or user control of the throttle T2.

Next, as the driver applies the throttle, the vehicle will begin a speed control procedure. The vehicle will not exceed the driver's throttle equivalent speed, but will set an autonomous-couple speed. The autonomous-couple speed is fast enough to make timely progress, yet slow enough to react during the kingpin to 5$^{th}$ wheel coupling process. A further augmentation to the transmission T controls low speed movement until the vehicle speed equals the required speed. The vehicle speed can be fixed and adjusted to maintain acceptable low speed movement until the vehicle speed equals zero. In one variation, the control system refers to input shaft speed data instead of output shaft speed data for low speed vehicle detection. Depending on the externally commanded direction required, the appropriate numerical forward or reverse gear will be selected, engaged, and maintained prior to movement. That is, the driver and system can select a gear other than first gear because the load or conditions require a different gear to maintain vehicle motion.

Next, with the Autonomous Dock routine configured and active, vehicle movement toward the target object commences with a controlled ramp up of a blended throttle feature. Ramping occurs until a pre-determined amount of movement is achieved, for example 2 km/h or less. This can be referred to as an "auto-launch" operation to achieve a target speed, or ideal approach speed. This speed target is maintained via clutch position control, or transmission gear change or engine speed control, as appropriate. As the vehicle progresses, the proper clutch position and engine torque can be learned through a feed-forward process. The speed target can be maintained until movement ceases or until the connection distance is traversed, or as above, until the closing distance is encountered.

Example: Alternative Software Controls

Autonomous low-speed maneuvering requires the vehicle to be able to reach and hold an externally commanded speed without driver input. An automated transmission, such as the ULTRASHIFT Plus, can control forward speed due to it's ability to control the selected gear, clutch engagement, and engine torque through SAE J1939 commands.

A software solution for an autonomous-dock routine allows for precise vehicle speed control for low-speed maneuvering. The transmission receives a speed command generated either internally within the software or from an external controller over the SAE J1939 link. The transmission then accelerates or decelerates the vehicle to the commanded speed by automatically selecting a forward or reverse gear and using clutch controls and engine torque commands to actuate vehicle speed. The transmission software contains protections to allow vehicle speed control to be activated only under safe conditions and can be easily canceled by the driver.

If movement has ceased, one of two things has occurred: the vehicle has contacted the intended target object, or has come into a resistance preventing further movement (e.g. chuckhole, slight grade change, etc.). Assuming that neither is known, the system will apply a pre-determined amount of additional throttle (e.g. +5%) to slightly increase torque to resume movement. If no movement occurs after a pre-determined amount of time (e.g. 500 ms), contact with the intended target is assumed.

At this point the transmission T will pull to neutral N and request activation of the parking brakes. If electronic parking brakes are not available, service brakes may be used or user brake inputs UB can be actuated. A tone will sound to request the driver select neutral N on the shift lever and confirm the truck has successfully docked.

As an alternative, when the closing distance is encountered, a speed ramp down can be initiated to slow the vehicle prior to target TG1, TG2 contact. This can comprise commands to the speed-control mechanism to sequentially do one or more of lower one of engine RPMs, gear selections, or throttle position, or move the clutch from closed to open or slipping to fully open.

Up to this point, torque to the wheels is maintained. Once the system has registered that it is in contact with the intended target TG1, TG2, whether by using the systems described above or via VORAD or GPS verification, the system will enter a safe mode.

An additional augmentation is to add an "Auto-Park" input P, such as a button or lever position, to the ULTRA-SHIFT and ULTRASHIFT Plus control consoles. This simplifies user operation by permitting an automatic transmission shift from forward F to reverse R. The auto-launch feature can be used to bring the vehicle up to speed. And, auto-launch can be an aspect of auto-park. Auto-launch functionality can be used to bring the vehicle V1, V1TG1 up to speed, and then auto-dock can be used to control the vehicle V1, V1TG1 to target, then ultimately bring the vehicle to zero speed. So, a driver can brake via user brakes UB and select the auto-park feature P. Auto-launch can then bring the vehicle from the braked condition to a moving condition. Auto-dock sequence can resume, with the moving condition further comprising one or more of the ultra-creep, connection distance CD1 speed selection and closing distance CD2 speed selection.

Example: Safety Checks

ULTRASHIFT Plus products benefit from means to vary clutch C control methods for vocational operations (i.e. urge to move) or terrain (i.e. soft sand). So, a proposed control scheme for controlling the clutch C was outline above for FIG. 6C, and alternative clutch control comprising safety checks is as follows and as outlined in FIG. 6D. The above control routine can comprise the below routine with safety checks.

A driver-controlled urge to move feature considers prerequisites to enter urge to move for an ULTRASHIFT Plus transmission. Prerequisites can comprise selection of a Low mode L and selection of 1st gear confirmed as engaged. Computer control via master controller 100 can confirm the physical configuration of the vehicle V1, V1TG1 is set to allow the urge to move feature, and can confirm whether the transmission model is the correct category, such as VMS (26:1 transmission).

The urge to move feature uses a predetermined Urge to Move Torque point (UMTp) that provides an initial clutch torque transfer through the clutch C to the input shaft of the transmission T. The urge to move feature torque point UMTp value can be determined two different ways: it is operator selected in step 633 or service brake air pressure controlled in step 647. The operator selection of step 633 allows the urge to move feature to transition from active torque transfer by the transmission T to a parked mode. But the service brake air pressure control module of step 647 automatically transfers between the active torque transfer and the parked mode by turning off the clutch C as braking power is activated. The operator selection and the service brake air pressure control can be implemented individually or in combination. When combined, the urge to move feature torque point UMTp protocol gives optimal operator preference plus clutch abuse management.

In the operator selection method of step 633, the vehicle brakes B1-B4 are released in step 630 and the operator affirmatively selects the urge to move mode. The master controller 100 confirms prerequisites are met in step 635. If not, there is no urge to move. But if prerequisites are met, then clutch transceiver and sensor CS, in this case an ECA (electronic clutch actuator), moves to the TtTP (Torque Touch Point) in step 637. The TtTP is where the clutch C just begins to transfer torque to the input shaft by getting the shift fork to engage the clutch plate. As above, a clutch C can comprise a single or dual disc assembly that can transfer torque from an engine to a transmission or another driveline component. An exemplary clutch assembly can comprise a front disc, an intermediate disk, a rear disc, and a cover assembly. Front disc can be coupled to a flywheel F of an engine E to rotate. A clutch cover can be oriented towards the transmission T, and can connect to mechanisms, such as a release bearing assembly or like device, to engage and disengage the clutch components. The clutch C can be a push or pull type, and can comprise other actuators, such as a catapult linkage, a concentric actuator, an electric actuator, mechanical rod, hydraulic system, or the like. The clutch C can be adjustable or wear through, and can comprise a variety of clutch friction discs. The discs can vary in spline size, facing type, number of facings, cushion rate, damper rate, damper assembly, facing material and can optionally comprise predamper mechanisms, among other variables. A hub and other customary clutch components can be arranged for torque transfer and to couple to the clutch friction discs and damper mechanisms. Various alternatives are possible.

The user can increase the gear of the transmission or directly increase the engagement of the electronic clutch actuator ECA. Pressing the user clutch UC can increase the engagement of the ECA. Or, by buttoning up the gear selection GS, as by pressing a gear up GU button or moving a shifter knob on a shift console, the user can increase the urge to move to the desire amount. But, the ECA engagement may not exceed a preselected MtTP value (Mid torque Transfer Point), so a decision is made at step 661. If the MtTP is exceeded, either the ECA is adjusted to decrease the torque value transferred across the clutch, or the master controller 100 exits the urge to move mode in step 663.

As already outlined above in steps 606, 607, 626, & 627, clutch lockup can be enabled or disabled. Part of those decisions can be based on whether or not the user has applied the throttle, or to what extent the user has applied the throttle, so a decision step 641 compares the throttle position as set by the user or system. If the throttle is applied, then the ECA can continue to or toward clutch lockup in step 643, and on to implement urge to move in step 645. But if no clutch locking is required, then urge to move can be implemented in step 645 without clutch lockup.

The algorithm is programmed to check multiple additional conditions. Examples include decision step 671, which indicates that the parking brake or other user brake is set. If so, then there is no urge to move in step 675. Or, if system diagnostics indicates a fault in the system in step 673, such as a fault to the service brakes, then there is no urge to move in step 675. When these and other conditions, such as MtTP value, have the correct negative indications, the master controller 100 can progress towards implementing the urge to move mode.

A more autonomous approach occurs in step 647, and the urge to move mode is linked to the service brake air pressure control system, so that this control system is linked to the clutch control. This can be achieved by incorporating bidirectional communication on the CAN so that the brakes ECU 600 can issue commands to the clutch ECU 300. Or, the master controller 100 can implement the urge to move mode algorithms and issue commands to both brakes ECU 600 and clutch ECU 300.

In step 649, the algorithm or user checks that prerequisites are met. User or system interventions occur in step 677 as necessary. If prerequisites are met, then the master controller 100 or other ECU applies a sloped release of the brakes while moving from the clutch disengaged position to the TtTP (torque touch point) and towards the MtTP (mid torque touch point) in step 651. The ECA can move between TtTP and MtTP based on a negative, relatively linear slope that links torque or clutch position to the air pressure of the service brake air pressure applied to the service brake. For example, if the service brakes are holding, then there is no urge to move. But a release of air pressure to the service brakes can have a corresponding move from clutch open position to TtTP. The clutch can move to or towards MtTP or clutch lockup as the air pressure to the service brake moves to zero or near zero.

Figure 6D:
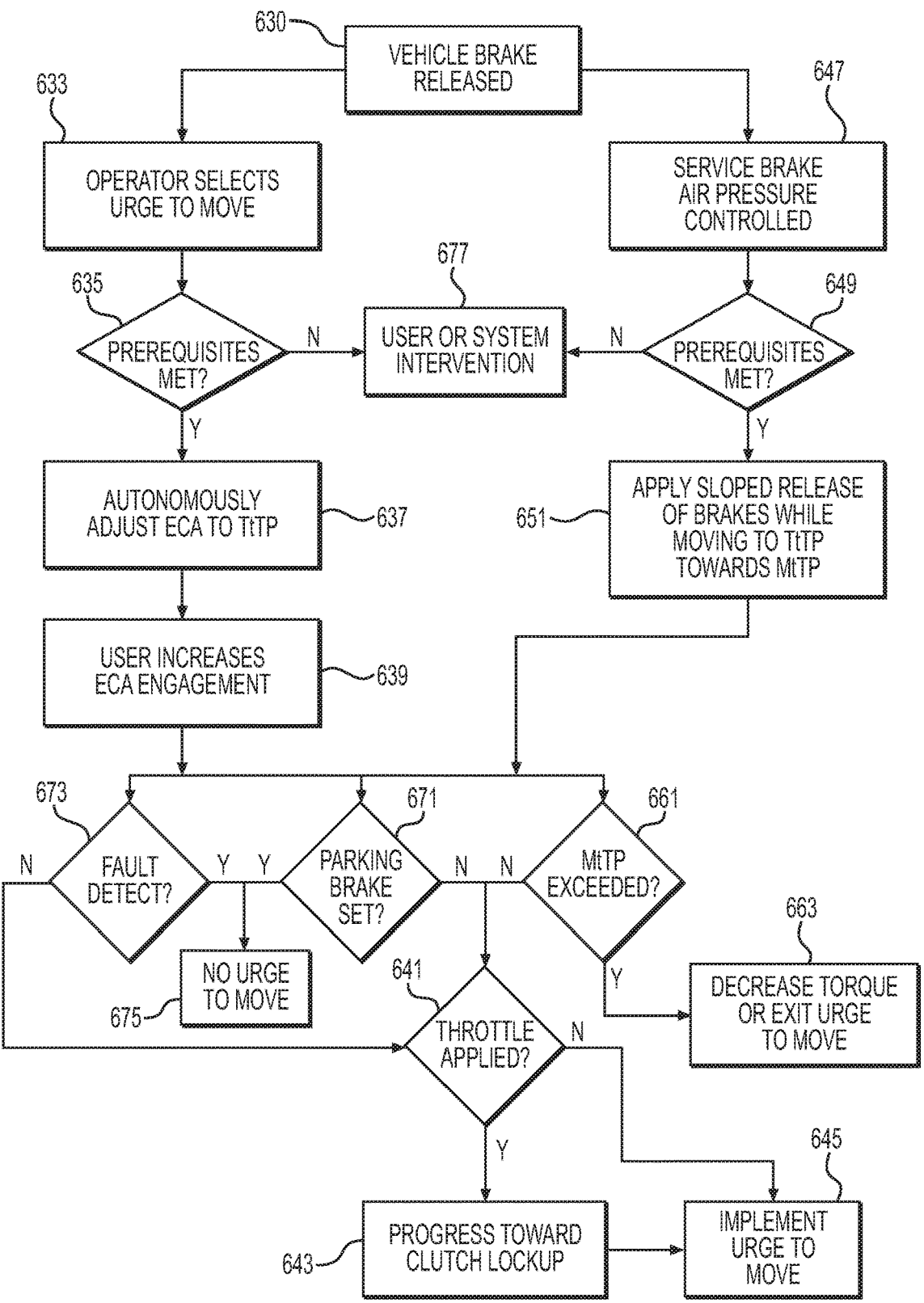

Other safety checks and steps are common to both operator-selected urge to move and the service brake air pressure controlled urge to move, as illustrated in FIG. 6D.

Since one aspect of a computer controlled transmission, such as the ULTRASHIFT and ULTRASHIFT Plus, is to limit clutch pedal action, it is possible to override user input via "enable" and "disable" commands. So, once urge to move or autonomous dock are selected, for example, user engine speed control can be overridden to maintain an appropriate speed for the connection or closing distances CD1, CD2. The user can override the system via brake use or button or other indicator selection to exit the autonomous modes.

However, engine speed control by the driver can also be used to force an exit from autonomous dock modes.

Alternatively, it is possible to permit more clutch slip at a slow operating speed. With more slip, more speed control is given to the transmission T to autonomously avoid stalling the engine and to permit an "ultra creep" to the target object.

Example: Trajectory Calculations

Triangulation and other schemes can be used to implement vehicle control. The master controller 100 can accept inputs from a variety of sources, as above, and can implement one or more of the trajectory control schemes outlined below.

When the set-up comprises real time kinematic (RTK) GPS sensors as part of transceivers TX1, TX2 . . . or TXD1, TXD2 . . . , the sensors provide a position estimation of within 10 cm (+−5 cm) accuracy. A pairing of sensors can be designated, and each pair of the RTK sensors is comprised of a base and a rover. The RTK sensor provides the relative distance from the base to the rover. Two base units from the RTK pair are located on the dock target TG2 as transceivers TXD1, TXD2, and the two rover units are located on the vehicle V1, V1TG1 in the form of transceivers TX1, TX3.

Using two units on the dock target TG2 and two units on the truck vehicle V1 improves the ability to automatically determine the orientation of the dock and the truck. More than two units, or more than two pairs, can further improve positioning by providing additional data points and information redundancy.

Each rover (transceiver TX1, TX3) treats the base (transceiver TXD1, TXD2) as the center of its North-East coordinate system. When the autonomous dock routine starts, there is no linkage between the two pairs of the RTK sensors. Initialization is performed by first interlinking the rover of one pair to the base of the second pair to obtain the relative coordinates of the second pair of RTK sensors.

Another possible layout and implementation accurately measures the longitude and latitude and orientation of the dock and initializes this on the truck units.

The trajectory generation algorithm will reside on one of the ECUs on the vehicle V1, such as within master controller 100 or an ECU within one of the GPS boxes (transceivers TX1, TX3). The trajectory generation algorithm can be relied upon by master controller for calculating and commanding vehicle speed in step S510. So, the trajectory generation algorithm results will be used to command a longitudinal speed and steering angle for the truck transmission ECU 200, the steering mechanism ECU 400 and the brakes ECU 600.

Another system setup around the dock for self-docking implementation provides the ability of fleets to implement self-docking operation with the trucks in a yard. Sensor combinations can be used to achieve this functionality.

While positioning sensors such as GPS are in widespread use at present, the accuracy of the position estimate is not conducive to perform a self-docking maneuver using a GPS sensor alone. So, an augmented system configuration is suggested. For example, an absolute positioning sensor (GPS) can be paired with ultrasonic or electromagnetic sensors for object detection. Dock position can be available as a vector of longitude/latitude pairs. The dock position can be very accurate and can be obtained using meteorological instruments.

GPS can be utilized to go from one position with respect to the dock to within a few meters of the dock. Novel trajectory planning algorithms can be implemented with this approach so that the vehicle orientation can be ascertained using multiple GPS antennas on the vehicle. In this approach, the orientation determination occurs using either an initialization procedure, or is learned and corrected once the vehicle starts moving.

To initiate the movement, either ultrasonic sensors can be utilized around the truck for obstacle detection or such input can be obtained from another system, such as camera, RADAR, or LIDAR.

Ultrasonic sensors can be installed on the back of the truck and can be activated when the dock is within the detection range of the ultrasonic sensors. The final truck docking is performed with sensor information from the ultrasonic sensors.

Another set-up uses a camera based proximity detection system. In this setup, the docks are marked with specific color line markers to indicate their location. The camera based proximity detection system can pick up the specific line markers as dock position. Accurate GPS location of the dock can also be obtained and a GPS sensor on the truck will determine the truck position with respect to the dock. For larger separation, the GPS information will be required to maneuver the truck to the dock. The camera based proximity detection system can be utilized for obstacle avoidance. Once the dock is in the view of the camera system, the relative distance to the dock from the camera system can be utilized to dock the truck.

Another implementation uses an RTK GPS sensor with or without an ultrasonic or electromagnetic sensor. The RTK GPS sensor provides the locational accuracy of +−5 cm.

In one setup, multiple RTK sensors are utilized to indicate dock positions. The RTK sensors on the truck communicate with the RTK sensors on the dock and determine their orientation based on this information. This setup is ideal for situations where the dock orientation cannot be measured and keeps changing (for example, if the truck needs to a backup to a dock that does not have RTK sensors instrumentation, a pair of sensors can be deployed and removed after docking is completed). For truck yards or bays that are supposed to have a permanent deployment of the autonomous docking trucks, accurate dock positions and orientations can be measured and stored on the truck. This deployment will need fewer RTK sensors to be deployed on the docks (at least 1, at most twice based on the number of docks). Based on this deployment, the orientation of the truck and the dock is available for the control algorithm and the trajectory planning algorithm.

Figure 9C:
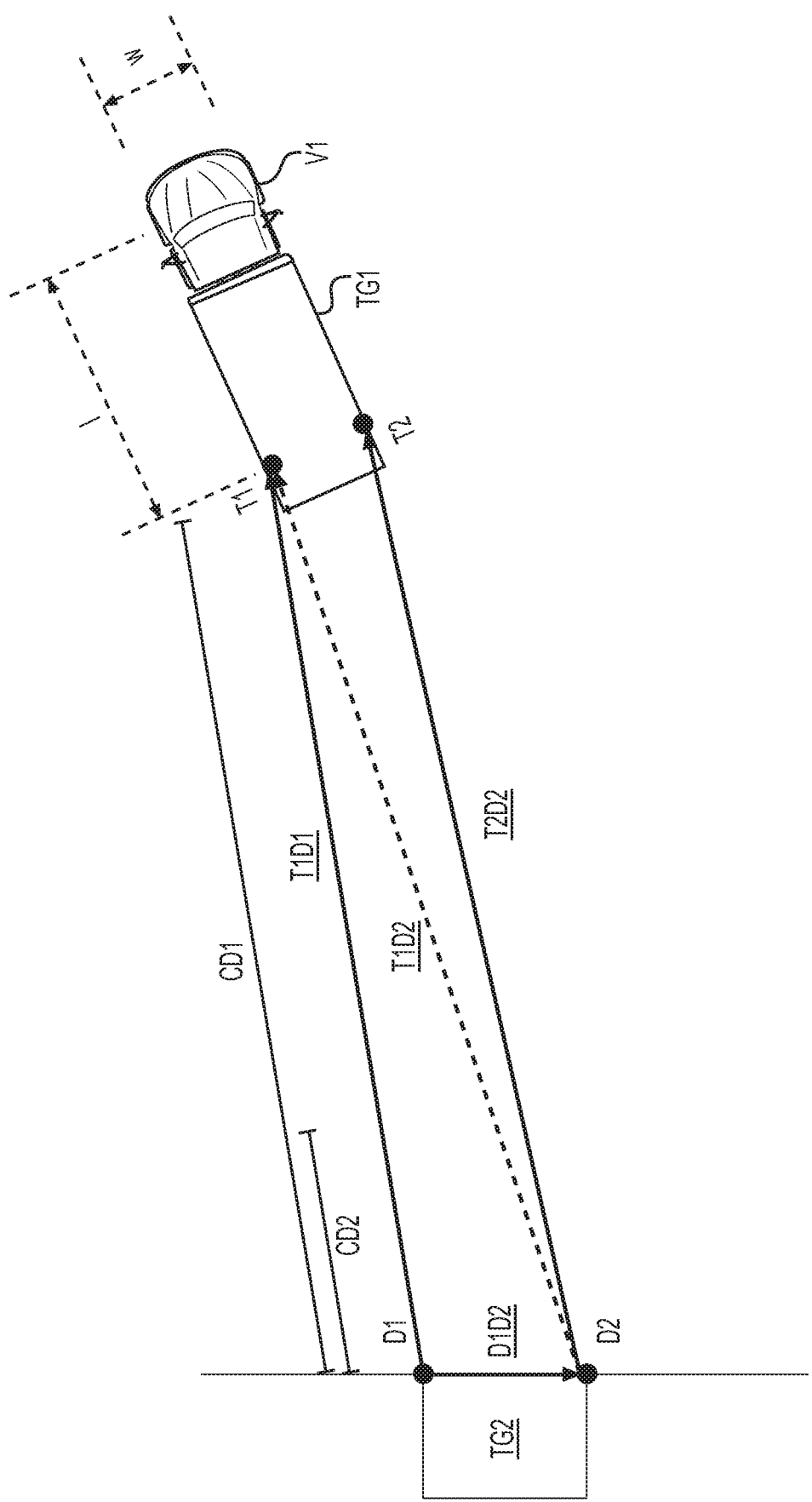
FIG. 9C is an exemplary layout for calculating relationships between the alternative vehicle and the alternative target of FIGS. 9A & 9B.

Turning to FIG. 9C, vehicle V1 is coupled to target TG1. Two points T1, T2 are known in relation to the vehicle length l and width w, as by rover transceivers TX4, TX5. On the target TG2, a distance D1D2 between two points D1, D2 is known via base transceivers TXD1, TXD2. Distances T1D1, T1D2, and T2D2 can be calculated and updated during the autonomous dock routine. Iteratively applying the calculations updates the master controller 100 as to the location of the vehicle V1 with respect to the target TG2 and permits adjustments to the speed change commands. Master controller can also update commands to the ECUs 200, 300, 400, 500, 600. Using a triangulation strategy can yield the extrapolation of the coupling distance CD1 and closing distance CD2. As the vehicle moves, the distances are recalculated to confirm the vehicle is on the proper trajectory.

Figure 10:
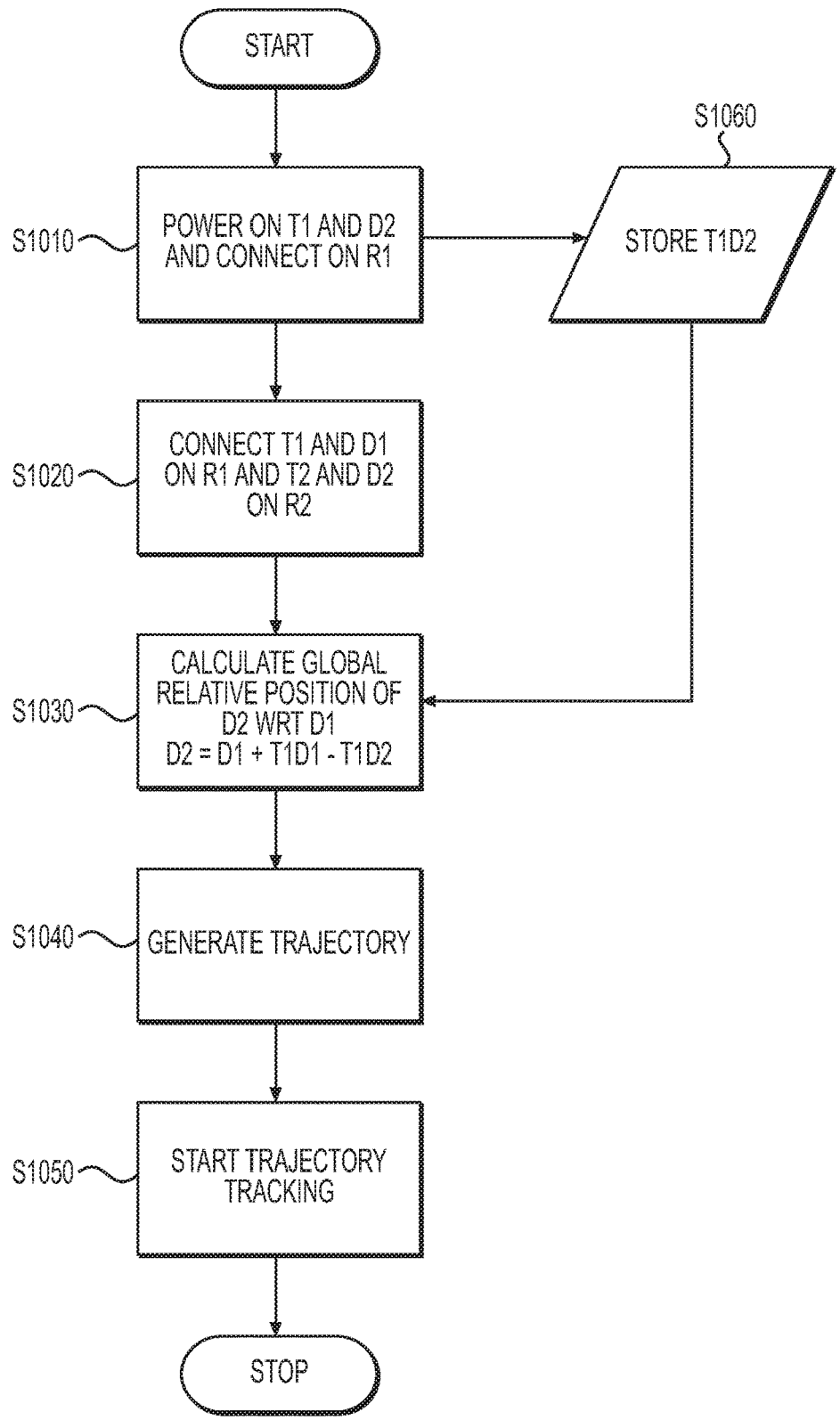
FIG. 10 is an example for calculating locations and implementing trajectory considerations.

One strategy is shown in FIG. 10, and comprises powering up transceivers TX4 and TXD2 to determine points T1 and D2. Instead of routing communications via satellite, it is possible to route communications via a local radio frequency channel that is restricted in area, frequency or signal strength so that it works within a proximity of the rover and base transceivers. Connecting communications between a radio pairing R1, such as radio TX2 and TXD2 of FIG. 4A, is part of step S1010. The distance T1D1 is stored in memory device 110 of master controller 100 in step S1060. In camera, LIDAR, VORAD or other systems, determining the points and distances does not require cross-talk to establish communications, rather the camera, laser or radar devices on the vehicle V1, V1TG1 establish that they have found an indicator on the target TG2 that sets the points D1, D2, such as a visual indicator, reflector, or other known detectable mechanism. Communication can be in the form of appropriate feedback from the indicator, as the case may be.

In step S1020, radio paring R1 then detects points T1 and D1 and a second radio pairing R2 is used to connect communications between transceivers TX1 & TXD1 to determine points T2 and D2. This can comprise the same or separate radio devices being used for each base and rover pairing. Distances T1D1 & T2D2 are found. Then, as by calculating a global relative position of point D2 with respect to point D1, point D2 can be found in step S1030. In this example, point D2 is found by subtracting location coordinates for T1D2 from coordinates for T1D1 and adding in coordinates for D1. By knowing a relationship of D1, T1 and D2, the triangulation scheme yields location results that can be used for trajectory generation in step S1040. Trajectory tracking can be started in step S1050, which can comprise ensuring the vehicle V1 follows a planned path between the starting vehicle point and a docked position.

Figure 11A:
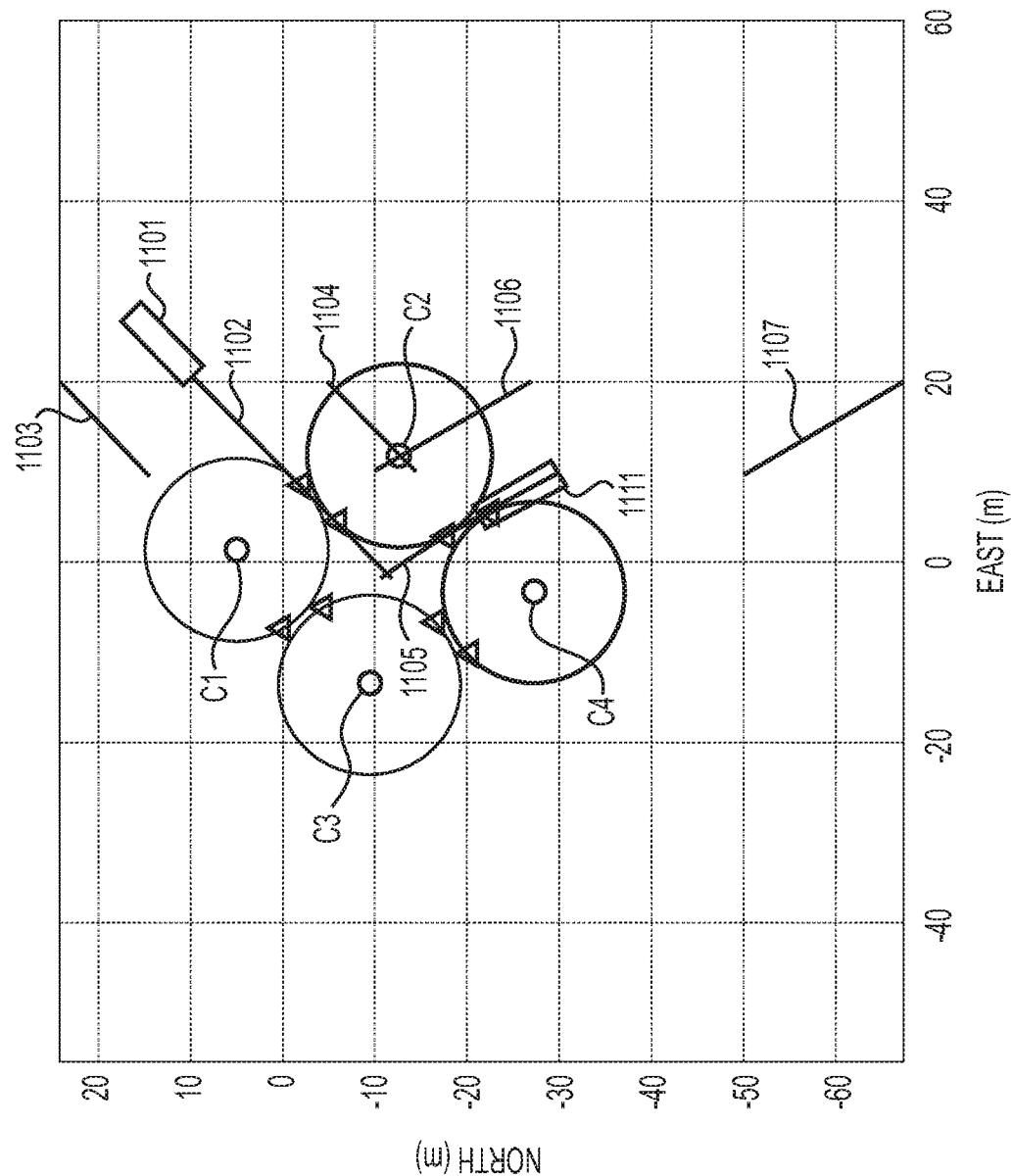
FIG. 11A is an example of a trajectory generation method.
Figure 11B:
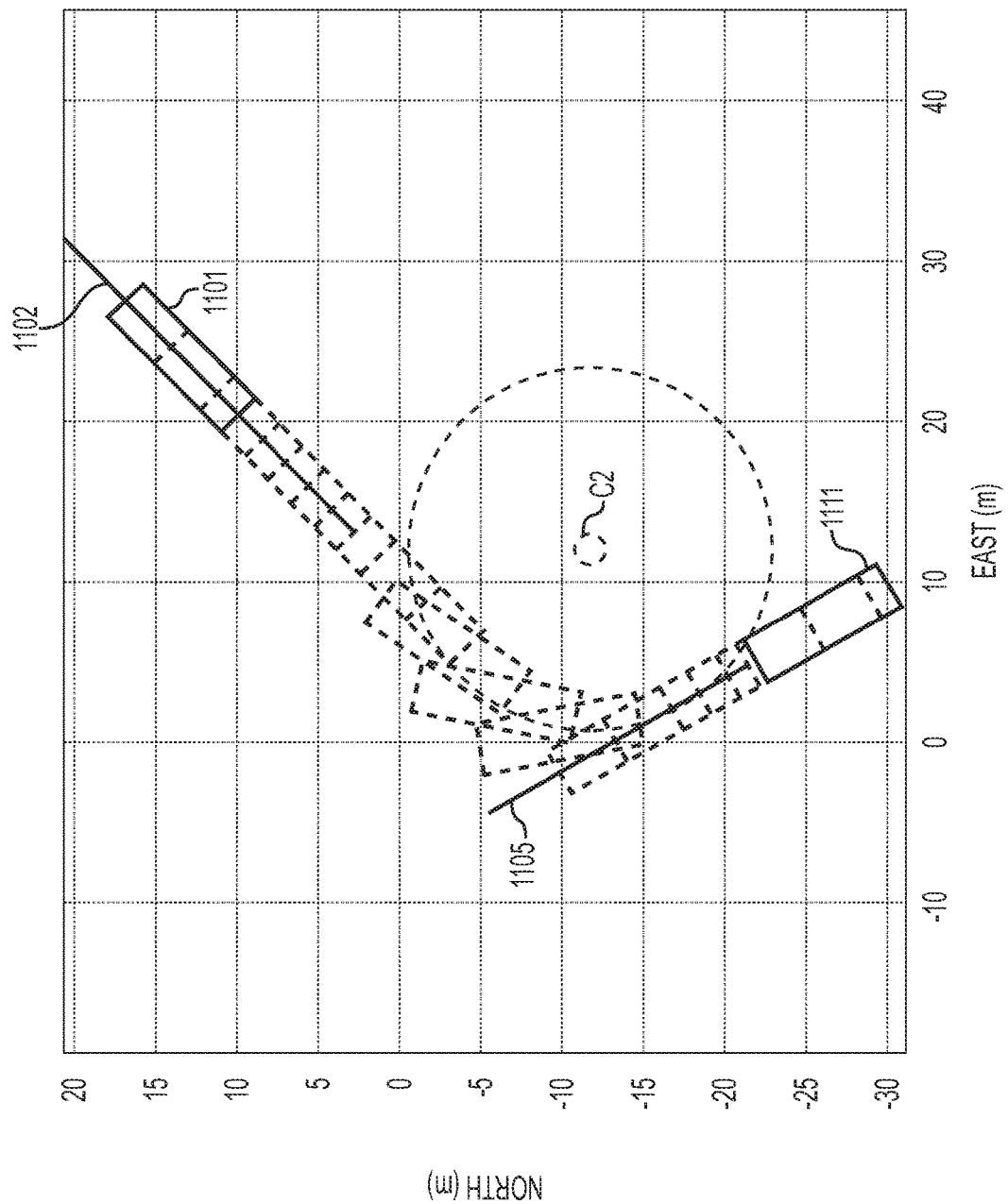
FIG. 11B is an example of a generated and tracked trajectory.

Trajectory generation in step S1040 can comprise identifying an initial truck position 1101 and a desired final truck position 1111. FIGS. 11A & 11B show an example of trajectory generation and tracking for a vehicle with a north and east coordinate system in meters. It is not intended that the disclosure be limited to the coordinates and distances used in the example. Straight line points are indicated via triangles in FIG. 11A. Intersecting straight lines, which can derive from first straight line or second straight line above, can join the initial and final positions. To this end, a first straight line 1102 is along the vehicle long-axis at its initial truck position, and a second straight line 111 is along an axis for the desired final truck position. The relative orientations of the vehicle in the initial truck position 1101 and final truck position 1111 can also be known. Several circles C1, C2, C3, C4 can be generated tangent to the intersecting straight lines. Parallel lines 1103, 1104 can be parallel to straight line 1102 to assist with circle placement and generation, as can parallel lines 1106 and 1107 be parallel with second straight line 1111 to assist with circle placement. The circles can comprise the smallest turning radius available for the vehicle V1, and can be based upon turning conditions such wheel base or conditions for jack-knifing the trailer target TG1 with respect to the truck vehicle V1, among others.

The master controller 100 can select the smallest travel distance available based on the intersecting lines and tangent circles. The correct final orientation can be chosen from among the lines and circles. As shown in FIG. 11B, a trajectory can be selected and tracked as the vehicle moves from the initial truck position 1101, along or relative to the first straight line 1102 to the desired final truck position 1111 along or relative for the second straight line 1105. Phantom interim truck positions are shown, and a phantom for the circle C2 for the selected turning radius is also shown in FIG. 11B.

Other implementations will be apparent to those skilled in the art from consideration of the specification and practice of the examples disclosed herein.

What is claimed is:

1. An autonomous dock system, comprising:
    a vehicle comprising a processor-controllable transmission system comprising selectable gears;
    at least one sensor or transceiver on the vehicle;
    at least one transponder on a dock target;
    a control system, comprising a processor, tangible memory device, and processor executable instructions stored in the tangible memory device, the instructions, which when executed by the processor, configured to implement an autonomous dock process comprising:
        calculating a connection distance between the at least one sensor or transceiver and the at least one transponder; and
        controlling the transmission system to autonomously change one or more gears of the selectable gears to ramp vehicle speed and traverse the connection distance to connect the vehicle with the dock target.

2. The autonomous dock system of claim 1, wherein controlling the transmission system to autonomously change gears of the selectable gears to ramp vehicle speed further comprises selectively ramping vehicle speed upwards and downwards to connect the vehicle with the dock target.

3. The autonomous dock system of claim 1, wherein the connection distance comprises a closing distance, and wherein controlling the transmission system to ramp vehicle speed further comprises:
    a first ramp of the vehicle speed upwards along the connection distance; and,
    when the closing distance is encountered, a second ramp of the vehicle speed downwards.

4. The autonomous dock system of claim 1, wherein the control system is configured to autonomously sense a stopped vehicle condition and to ramp a vehicle throttle to overcome the stopped vehicle condition.

5. The autonomous dock system of claim 4, wherein the control system applies a timing factor to ramp the vehicle throttle, and, when the processor detects that the stopped condition is not overcome within a limit of the timing factor, the control system autonomously implements one of a neutral condition and a parked condition.

6. The autonomous dock system of claim 1, wherein:
    the vehicle comprises at least two sensors or transceivers and at least two axles, each of the at least two axles comprising a respective first end and a respective second end,
    a first of the at least two sensors or transceivers is located on a first end of a first axle,
    a second of the at least two sensors or transceivers is located on a second end of the first axle, and
    the dock target comprises at least two transponders spaced by a transponder distance.

7. The autonomous dock system of claim 6, wherein the control system applies a triangulation technique to determine a trajectory for the vehicle to align with the dock target.

8. The autonomous dock system of claim 6, wherein the control system applies a triangulation technique to determine the connection distance.

9. The autonomous dock system of claim 1, wherein the control system iteratively recalculates the connection distance, and wherein the control system processes the recalculated connection distance to determine whether to further change one or more gears of the selectable gears.

10. An autonomous dock system, comprising:
    a control system integrated into a movable vehicle, the control system comprising a controller area network, a location sensor or transceiver, a steering mechanism comprising a steering actuator, a speed control mechanism comprising a selectable gear transmission, a processor, a tangible memory device, and processor executable instructions stored in the tangible memory device, which, when executed by the processor, are configured to implement an autonomous dock process comprising:
        calculating a connection distance between the location sensor or transceiver on the movable vehicle and at least one transponder on a target;
        selecting a connection speed setting comprising:
            processing an impact limit of the target; and
            selecting a gear selection limit of the selectable gear transmission so that the movable vehicle does not exceed the impact limit of the target;
        calculating a trajectory between the movable vehicle and the target;
        formulating a control scheme for the steering mechanism; and
        commanding the steering mechanism and the speed control mechanism of the movable vehicle to follow the calculated trajectory and to contact the movable vehicle with the target, wherein a vehicle speed is ramped by changing the gear selection of the selectable gear transmission from a parked condition, through the connection speed setting, and back to the parked condition while remaining under the gear selection limit.

11. The system of claim 10, wherein the processor further implements:
    calculating a closing distance as a subset of the connection distance; and
    selecting a closing speed setting as a lower-speed subset of the connection speed setting; and
    autonomously ramping the vehicle speed to the lower-speed subset over the closing distance.

12. The system of claim 10, wherein the processor further implements instructions for autonomously sensing a stopped vehicle condition and implements a ramping sequence to overcome the stopped vehicle condition, wherein the ramping sequence comprises:

determining an upper ramping speed limit;
instructing the speed control mechanism to increase the vehicle speed up to the determined upper ramping speed limit; and
applying a timing factor to limit the time that the vehicle speed is maintained at the upper ramping speed limit.

13. The system of claim 12, wherein the processor further implements instructions to iteratively determine whether the stopped vehicle condition is sensed or whether a moving condition is sensed, and, when the stopped vehicle condition is sensed in excess of the timing factor, the processor autonomously implements one of the parked condition or a neutral condition.

14. The system of claim 12, wherein determining the upper ramping speed limit comprises processing one or more of input or sensed vehicle load, sensed stall-out characteristics of the vehicle, sensed or input vehicle grade, and the calculated trajectory, and wherein determining the upper ramping speed limit comprises processing the impact limit of the target.

15. The system of claim 10, wherein selecting the connection speed setting comprises processing one or more of sensed or input vehicle load, sensed stall-out characteristics of the vehicle, the calculated connection distance, sensed vehicle grade, and the calculated trajectory.

16. The system of claim 10, wherein the speed control mechanism comprising a selectable gear transmission further comprises a rotatable input shaft connection, and wherein the autonomous dock process further comprises instructions to restrict the rotatable input shaft connection so that the movable vehicle does not exceed the impact limit of the target.

17. The system of claim 10, wherein the speed control mechanism further comprises a computer-controlled throttle, wherein the computer-controlled throttle comprises a range of open and closed positions between fully open and fully closed, and wherein the autonomous dock process further comprises instructions to select a throttle position from the range of open and closed positions so that the movable vehicle does not exceed the impact limit of the target.

18. The system of claim 10, wherein the speed control mechanism further comprises a computer-controlled clutch, and wherein the autonomous dock process further comprises instructions to command that the computer-controlled clutch remain unlocked.

19. The system of claim 10, wherein the speed control mechanism further comprises a computer-controlled clutch affiliated with an engine, and wherein the autonomous dock process further comprises instructions for:
collecting and processing engine idle data to determine whether the engine is in a high idle condition or a low idle condition; and,
when the engine is in the high idle condition, locking the computer-controlled clutch with respect to the engine.

20. The system of claim 10, wherein the speed control mechanism further comprises a computer-controlled clutch affiliated with an engine, and wherein the autonomous dock process further comprises instructions for:
collecting and processing engine idle data to determine whether the engine is in a high idle condition or a low idle condition; and,
when the engine is in the low idle condition, controlling the computer-controlled clutch to prevent locking with respect to the engine.

21. The system of claim 10, wherein calculating the trajectory comprises collecting and processing triangulation data of the movable vehicle and of the target.

22. The system of claim 10, wherein calculating the trajectory comprises:
identifying an initial vehicle position and an initial vehicle orientation;
determining a straight-line path centered on the initial vehicle position in the direction of the initial vehicle orientation;
identifying a target position;
calculating intersecting lines from the target position to the straight-line path;
processing a circle of the smallest vehicle turning radius that can be achieved tangent to the straight-line path and tangent to the intersecting lines to identify a pair of intersecting lines; and
processing the identified pair of intersecting lines to select a shortest path to the target position.

23. The system of claim 22, wherein the movable vehicle comprises a $5^{th}$ wheel coupled to a kingpin, wherein the location sensor or transceiver further comprises an angle sensor coupled between the $5^{th}$ wheel and the kingpin, and wherein commanding the steering mechanism comprises instructions and processing configured to:
sense an angle between the $5^{th}$ wheel and the kingpin,
determine if the sensed angle corresponds to the calculated trajectory, and
adjust the steering mechanism to align the followed calculated trajectory with the selected shortest path.

24. The system of claim 10, wherein the controller area network is configured to communicate with the at least one transponder on the target, wherein the at least one transponder comprises one of a global positioning system (GPS), real-time kinematics system (RTK), radio-frequency system (RF device), or vehicle on-board RADAR (VORAD), and wherein the target comprises one of a trailer, a loading zone, or an unloading zone.

25. The system of claim 10, wherein the location sensor or transceiver comprises one of a global positioning system (GPS), a real-time kinematics system (RTK), a radio-frequency system (RF device), or a vehicle on-board RADAR (VORAD), wherein the vehicle comprises a $5^{th}$ wheel coupled to a kingpin, and wherein the location sensor or transceiver further comprises an angle sensor coupled between the $5^{th}$ wheel and the kingpin.

26. The system of claim 10, wherein the movable vehicle is a tractor comprising a $5^{th}$ wheel, wherein the target is a trailer comprising a kingpin, and wherein the control system connects the $5^{th}$ wheel of the tractor with the kingpin of the trailer.

27. The system of claim 10, wherein the movable vehicle is a tractor trailer or truck comprising a rear bumper, wherein the location sensor or transceiver is installed on the rear bumper, wherein the target is a loading zone or unloading zone, and wherein the control system aligns the rear bumper with the target.

28. An autonomous dock system for a vehicle, comprising:
a control system integrated into the vehicle, the control system comprising:
a controller area network;
a vehicle speed control mechanism comprising a selectable gear transmission;
a vehicle speed sensor or transceiver;
a clutch for transferring torque from an engine to the vehicle speed control mechanism, the clutch comprising a transceiver or sensor configured with a clutch position controller and a clutch torque detection system; and a master controller comprising a processor, a tangible memory device, and processor executable instructions stored in the tangible memory device, the processor executable instructions configured, when executed by the processor, to implement the steps of:

receiving a request to implement an autonomous dock routine;

calculating a vehicle speed and a clutch position;

commanding the clutch position controller to maintain the calculated clutch position;

iteratively detecting an actual torque amount transferred across the clutch;

commanding the vehicle speed control mechanism to maintain the calculated vehicle speed;

iteratively detecting the actual vehicle speed;

iteratively comparing the calculated vehicle speed to the detected actual vehicle speed;

when comparing the calculated vehicle speed to the detected actual vehicle speed indicates that the detected actual vehicle speed is below a speed threshold, and when the actual torque amount transferred across the clutch exceeds a torque threshold, commanding an adjustment to the selectable gear transmission to increase the actual vehicle speed;

applying a timing factor to the commanding of the adjustment to the selectable gear transmission to increase the actual vehicle speed; and when the timing factor is exceeded, implementing one of a neutral condition and a parked condition.

29. The system of claim 28, wherein the processor executable instructions are further configured to implement the steps of:

when comparing the calculated vehicle speed to the detected actual vehicle speed indicates that the detected actual vehicle speed is below the speed threshold, and when the actual torque amount transferred across the clutch exceeds the torque threshold, commanding an exit from the autonomous docking routine.

30. The system of claim 28, wherein commanding the vehicle speed control mechanism to maintain the calculated vehicle speed further comprises implementing one of a feed-forward subroutine or a feedback subroutine to adjust the vehicle speed control mechanism to maintain the calculated vehicle speed.

31. The system of claim 28, wherein the processor executable instructions are further configured to implement the steps of:

comparing the calculated vehicle speed to the detected actual vehicle speed; and when the comparing indicates that the vehicle has stopped moving, commanding an exit from the autonomous docking routine.

32. The system of claim 28, wherein the processor executable instructions are further configured to implement the steps of:

processing the actual torque amount transferred across the clutch relative to a torque threshold to monitor the vehicle for a wheel slip; and when a wheel slip is detected and when comparing the commanded vehicle speed to the detected actual vehicle speed indicates that the vehicle has stopped moving, commanding an exit from the autonomous docking routine.

33. The system of claim 28, wherein the processor executable instructions are further configured to implement the step of:

when comparing the calculated vehicle speed to the detected actual vehicle speed indicates that the detected actual vehicle speed is at zero, commanding an exit from the autonomous docking routine.

34. The system of claim 28, wherein the processor executable instructions are further configured to implement the step of exiting the autonomous docking routine when comparing the calculated vehicle speed to the detected actual vehicle speed indicates that the detected actual vehicle speed has decreased.

* * * * *